United States Patent
Jiao et al.

(10) Patent No.: US 9,108,875 B2
(45) Date of Patent: Aug. 18, 2015

(54) HEATING AND SHAPING SYSTEM USING MICROWAVE FOCUSED BEAM HEATING

(71) Applicant: PPG Industries Ohio Inc., Cleveland, OH (US)

(72) Inventors: Yu Jiao, Blawnox, PA (US); Robert M. Bonaddio, Pittsburgh, PA (US); Joseph G. Koepfinger, Pittsburgh, PA (US); Joseph Medzius, Cranberry Township, PA (US); James Franklin Priddy, Huntsville, AL (US); Russell Willis Schrier, Oakmont, PA (US); Dennis D. Warren, Fayetteville, TN (US); Chao Yu, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 146 days.

(21) Appl. No.: 13/905,365

(22) Filed: May 30, 2013

(65) Prior Publication Data

US 2014/0352357 A1    Dec. 4, 2014

(51) Int. Cl.
| | |
|---|---|
| C03B 29/08 | (2006.01) |
| C03B 23/023 | (2006.01) |
| C03B 35/18 | (2006.01) |
| C03B 25/02 | (2006.01) |
| C03B 35/20 | (2006.01) |
| C03B 40/00 | (2006.01) |
| C03B 35/16 | (2006.01) |

(52) U.S. Cl.
CPC ........... *C03B 23/0235* (2013.01); *C03B 25/025* (2013.01); *C03B 29/08* (2013.01); *C03B 35/187* (2013.01); *C03B 35/202* (2013.01); *C03B 40/005* (2013.01); *C03B 35/16* (2013.01); *C03B 2225/02* (2013.01)

(58) Field of Classification Search
CPC   C03B 23/023; C03B 23/0235; C03B 23/004; C03B 23/02; B65G 2249/02; B65G 49/066
See application file for complete search history.

(56) References Cited

U.S. PATENT DOCUMENTS

| | | | | |
|---|---|---|---|---|
| 1,559,591 | A | * 11/1925 | Stockstrom et al. | 414/152 |
| 2,377,849 | A | * 6/1945 | Binkert et al. | 65/103 |
| 2,620,932 | A | * 12/1952 | Alpine | 414/180 |

(Continued)

FOREIGN PATENT DOCUMENTS

| | | | |
|---|---|---|---|
| EP | 1770031 A1 | * 4/2007 | B65G 49/06 |
| WO | 01/83387 A1 | 11/2001 | |

OTHER PUBLICATIONS

PCT Search Report, PCT/US2014/038918, dated Aug. 19, 2014.

(Continued)

*Primary Examiner* — Jodi C Franklin
(74) *Attorney, Agent, or Firm* — Andrew C. Siminerio

(57) ABSTRACT

A furnace for shaping glass sheets for aircraft transparencies using the cut-to-size method includes a preheat and cooling furnace defined as a first furnace, and a shaping furnace. A conveyor geared for reciprocating movement moves a bending iron supporting a glass sheet through the first furnace set to a preheat temperature. The glass sheet supported on the bending iron is heated in the shaping furnace by microwave beams from a gyrotron to heat portions of the glass sheet to be shaped to a complex shape. After the sheet is shaped, the conveyor moves the bending iron supporting the shaped glass sheet from the shaping furnace through the first furnace set to a cooling cycle.

17 Claims, 10 Drawing Sheets

(56) References Cited

U.S. PATENT DOCUMENTS

| | | | |
|---|---|---|---|
| 3,160,491 A * | 12/1964 | Binkert et al. | 65/107 |
| 3,838,779 A * | 10/1974 | Dawson | 414/778 |
| 3,881,618 A * | 5/1975 | Tausheck | 414/728 |
| 3,896,954 A * | 7/1975 | Dawson | 37/461 |
| 3,936,291 A | 2/1976 | McMaster | |
| 4,004,901 A | 1/1977 | Starr | |
| 4,043,785 A * | 8/1977 | Reese | 65/107 |
| 4,065,284 A * | 12/1977 | Mang et al. | 65/114 |
| 4,072,493 A * | 2/1978 | Imler | 65/107 |
| 4,192,689 A | 3/1980 | Rinehart | |
| 4,302,417 A * | 11/1981 | Michelotti | 264/322 |
| 4,381,933 A * | 5/1983 | Schultz et al. | 65/106 |
| 4,604,934 A * | 8/1986 | Elliott et al. | 83/550 |
| 4,626,267 A * | 12/1986 | Reese et al. | 65/106 |
| 4,744,809 A | 5/1988 | Pecoraro et al. | |
| 4,820,902 A | 4/1989 | Gillery | |
| 4,976,762 A | 12/1990 | Anttonen | |
| 5,028,759 A | 7/1991 | Finley | |
| 5,120,570 A | 6/1992 | Boaz | |
| 5,137,561 A * | 8/1992 | Schnabel, Jr. | 65/168 |
| 5,306,324 A * | 4/1994 | Vehmas et al. | 65/104 |
| 5,431,966 A | 7/1995 | Daude et al. | |
| 5,565,388 A | 10/1996 | Krumwiede et al. | |
| 5,656,053 A * | 8/1997 | Boaz | 65/106 |
| 5,782,947 A * | 7/1998 | Boaz | 65/111 |
| 5,827,345 A | 10/1998 | Boaz et al. | |
| 5,900,034 A * | 5/1999 | Mumford et al. | 65/171 |
| 6,094,942 A | 8/2000 | Falleroni et al. | |
| 6,301,858 B1 | 10/2001 | Crandell | |
| 6,357,262 B1 * | 3/2002 | Friedel et al. | 65/29.19 |
| 6,368,994 B1 | 4/2002 | Sklyarevich | |
| 6,408,649 B1 * | 6/2002 | Sklyarevich et al. | 65/102 |
| 6,424,090 B1 | 7/2002 | Sklyarevich | |
| 6,598,426 B2 | 7/2003 | Vandal et al. | |
| 6,629,436 B1 * | 10/2003 | Skeen et al. | 65/107 |
| 6,718,798 B2 * | 4/2004 | Nitschke et al. | 65/104 |
| 6,810,784 B1 * | 11/2004 | Cunningham | 83/879 |
| 6,826,929 B2 * | 12/2004 | Boaz | 65/114 |
| 7,140,204 B2 | 11/2006 | Vandal | |
| 7,231,787 B2 | 6/2007 | Neuman et al. | |
| 7,237,408 B2 * | 7/2007 | Frank et al. | 65/291 |
| 7,240,519 B2 | 7/2007 | Schwartz et al. | |
| 7,270,236 B2 * | 9/2007 | Angeletti et al. | 206/448 |
| 7,344,613 B2 | 3/2008 | Sklyarevich et al. | |
| 7,459,199 B2 * | 12/2008 | Skeen et al. | 428/192 |
| 7,585,801 B2 | 9/2009 | Shelestak | |
| 8,062,749 B2 | 11/2011 | Shelestak et al. | |
| 8,087,133 B2 * | 1/2012 | Jerger et al. | 28/107 |
| 8,155,816 B2 | 4/2012 | Rashid et al. | |
| 8,234,883 B2 | 8/2012 | Krall, Jr. et al. | |
| 2002/0148255 A1 | 10/2002 | Vandal et al. | |
| 2002/0197423 A1 | 12/2002 | Wang et al. | |
| 2003/0019244 A1 * | 1/2003 | Thomas et al. | 65/119 |
| 2003/0037570 A1 | 2/2003 | Sklyarevich et al. | |
| 2003/0106340 A1 * | 6/2003 | Nitschke et al. | 65/104 |
| 2004/0000168 A1 | 1/2004 | Vandal | |
| 2005/0217319 A1 | 10/2005 | Yoshizawa | |
| 2005/0221017 A1 | 10/2005 | Sklyarevich et al. | |
| 2006/0026994 A1 * | 2/2006 | Yoshizawa | 65/114 |
| 2006/0185395 A1 | 8/2006 | Sklyarevich et al. | |
| 2007/0000285 A1 | 1/2007 | Vandal | |
| 2007/0045298 A1 | 3/2007 | Sklyarevich et al. | |
| 2008/0060744 A1 | 3/2008 | Sklyarevich et al. | |
| 2009/0078370 A1 | 3/2009 | Sklyarevich et al. | |
| 2009/0320524 A1 | 12/2009 | Abramov et al. | |
| 2011/0100060 A1 * | 5/2011 | Tetlow | 65/107 |

OTHER PUBLICATIONS

U.S. Appl. No. 13/714,494, filed Dec. 14, 2012, DeAngelis et al.

* cited by examiner

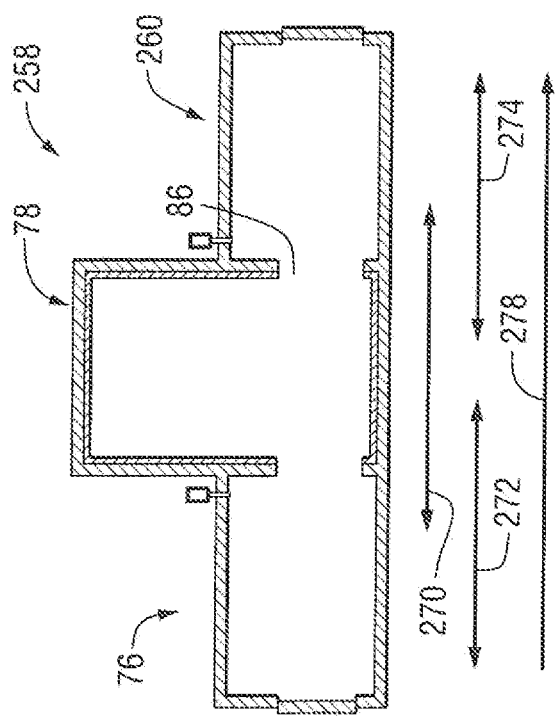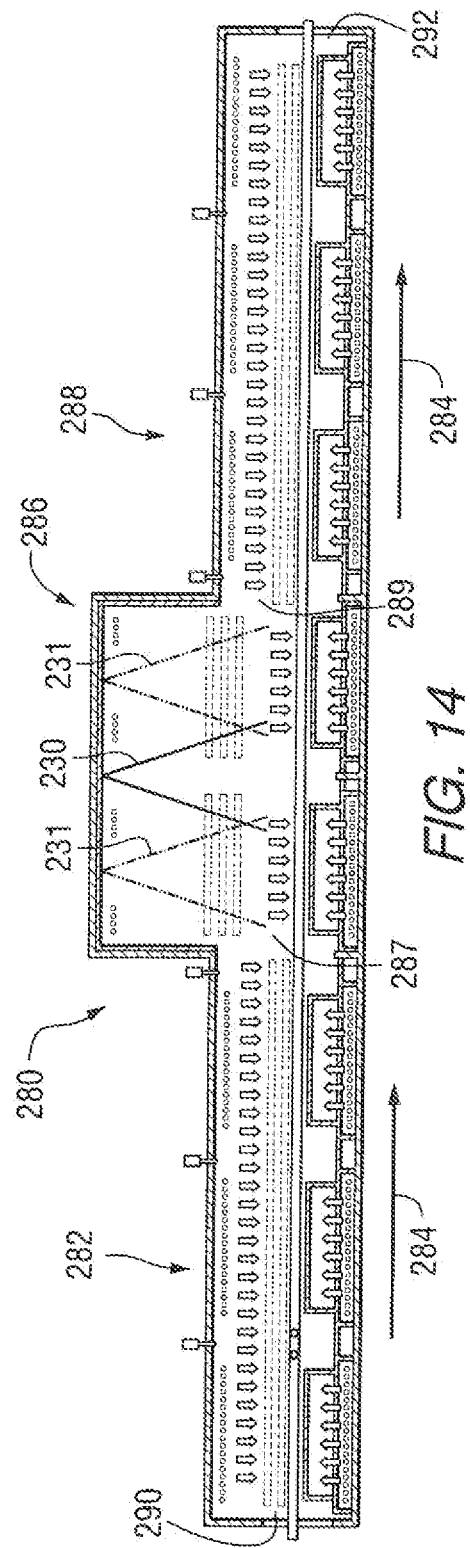

HEATING AND SHAPING SYSTEM USING MICROWAVE FOCUSED BEAM HEATING

RELATED APPLICATION

The bending irons disclosed in U.S. patent application Ser. No. 13/714,494, titled Bending Device For Shaping Glass For Use In Aircraft Transparencies filed on Dec. 14, 2012 can be used in the practice of the invention disclosed herein. The disclosure of U.S. patent application Ser. No. 13/714,494 (hereinafter also referred to as "USPA '494") in its entirety is incorporated herein by reference.

BACKGROUND OF THE INVENTION

1. Field of the Invention

This invention relates to a heating and shaping system using microwave focused beam heating, and more particularly, in one non-limiting embodiment of the invention, to a glass pilot line having a furnace having two heating chambers, wherein the first heating chamber is used to preheat one or more glass substrates to a first temperature; the second heating chamber maintains the substrates at the first temperature and heats and shapes selected portions of the one or more glass substrates using microwave focused beam heating, and the first heating chamber is used to controllably cool the one or more glass substrates to anneal or thermally temper the one or more shaped glass substrates.

2. Discussion of the Presently Available Technology

Bending devices, commonly referred to in the bending art as bending irons or shaping irons, are well known in the art for shaping one or more glass sheets for use in the manufacture of monolithic and laminated transparencies for land, water, air and space vehicles. The method for shaping the glass substrates or sheets for use in the manufacture of transparencies for land and water vehicles usually includes providing one or more glass sheets having seamed or smoothed edges and a predetermined size; moving the glass sheets supported on a bending iron through a furnace to heat soften the glass sheets; shaping the glass sheets; controllably cooling the shaped glass sheets to anneal or thermally temper the shaped glass sheets, and using the shaped glass sheets in the manufacture of a transparency for a land or water vehicle. The method for shaping glass substrates or sheets for use in the manufacture of transparencies for air and space vehicles usually includes providing one or more glass sheets having seamed or smoothed edges and a predetermined size; moving the glass sheets supported on a bending iron through a furnace to heat soften the glass sheets; shaping the glass sheets; controllably cooling the shaped glass sheets to anneal the shaped glass sheets; cutting the shaped glass sheets to a second predetermined size; seaming or smoothing the edges of the shaped glass sheets; chemically tempering the shaped glass sheets, or thermally tempering the shaped glass sheets, and using the tempered shaped glass sheets in the manufacture of a transparency for an air or space vehicle.

The difference of interest in the present discussion between shaping glass sheets for use with transparencies for land and water vehicles and shaping glass sheets for use with transparencies for air and space vehicles is that the glass sheets for use with transparencies for land and water vehicles are cut to size before shaping or bending, whereas glass sheets for use with transparencies for air and space vehicles are cut to an over size before shaping and cut to size after bending. For purposes of clarity, the process presently available for shaping glass sheets for use with transparencies for land and water vehicles is also referred to herein as "cut-to-size process", and the process presently available for shaping a glass sheet for use with transparencies in air and space vehicles is also referred to herein as "cut-after-bend process".

The cut-to-size process can be used for making transparencies for land and water vehicles because the glass sheets are thinner, e.g. a single glass sheet for making transparencies for land and water vehicles has a thickness in the range of 1.80 to 2.00 millimeters ("mm"), and usually two sheets have a thickness of 3.60 to 4.00 mm. The thickness of the glass sheets for making transparencies for air and space vehicles, on the other hand, are thicker e.g. a single glass sheet for making transparencies for air and space vehicles has a thickness in the range of 1.80 to 19.00 millimeters ("mm"), and usually two sheets have a thickness of 3.60 to 12.00 mm. or three sheets have a thickness of 5.40 to 18 mm. Because the stack of glass sheets used for making transparencies for air and space vehicles are thicker, the glass sheets remain in the furnace on the bending iron for a longer period of time to heat the stack of sheets to their shaping or bending temperature. Maintaining the glass sheets for long periods of time on a heated bending iron usually results in marring surface areas of the glass sheet in contact with the bending iron. The marring of the glass sheet can cause distortions on the surface of the glass sheet, which can make the optical quality of the glass sheet and subsequently formed transparency unacceptable.

One solution to the problem is to provide a bending iron that has improvements in its design to prevent the marring of the surface of the glass sheet in contact with the bending iron. Such a bending iron is disclosed in USPA '494. Another solution to the problem is to reduce the temperature of the furnace and/or the time period of the heating cycle for shaping the glass sheets to reduce or eliminate marring of the surface of the glass sheet in contact with the bending iron during the sheet shaping process.

As can now be appreciated by those skilled in the art, it would be advantageous to provide a process of, and equipment for, shaping glass sheets for use in aircraft and space transparencies using the cut-to-size process, while eliminating marring of the surface of the glass sheet in contact with the bending iron.

SUMMARY OF THE INVENTION

This invention relates to a furnace for shaping glass sheets for aircraft transparencies, the furnace includes among other things:

a preheat and cooling furnace defined as a first furnace, the first furnace including among other things:

a first sidewall, an opposite second sidewall, a top wall, an opposite bottom wall, a first opening and an opposite second opening;

a door for covering the first opening of the first furnace;

a first plurality of spaced stub conveyor rolls mounted on the first sidewall and a second plurality of spaced stub conveyor rolls mounted on the second sidewall, wherein each of the first and second plurality of stub rolls has a conveying end and an opposite drive end with the conveying end of the first and the second plurality of stub rolls within the first furnace and the drive end of the first and the second plurality of stub rolls extending out through its respective one of the first and second sidewalls of the first furnace, wherein the conveying end of the first and second plurality of stub rolls defines a first path through the first furnace, the first path extending from a position spaced from the first opening of the first furnace to the second opening of the first furnace, and the drive end of the first and the second plurality of stub rolls powered by a drive system;

a first heating system associated with the first furnace to heat and controllably cool the interior of the first furnace;

a shaping furnace defined as a second furnace, the second furnace including among other things:

a first sidewall, an opposite second sidewall, a top wall, an opposite bottom wall, an opening and a rear wall opposite to the opening of the second furnace, wherein the second opening of the first furnace and the opening of the second furnace are connected to one another;

a third plurality of spaced stub conveyor rolls mounted on the first sidewall of the second furnace and a fourth plurality of spaced stub conveyor rolls mounted on the second sidewall of the second furnace, wherein each of the third and fourth plurality of stub rolls has a conveying end and an opposite drive end with the conveying end of the third and the fourth plurality of stub rolls within the second furnace and the drive end of the third and the fourth plurality of stub rolls extending out through its respective one of the first and second sidewalls of the second furnace, wherein the conveying end of the third and the fourth plurality of stub rolls defines a second path through the second furnace, the second path extending from the first path to the rear wall of the second furnace, and the drive end of the third and the fourth plurality of stub rolls powered by the drive system;

a second heating system within the second furnace, wherein the second heating system includes among other things, a gyrotron system to heat selected portions of the glass sheet;

a U-shaped moveable conveyor including, among other things:

a first leg, an opposite second leg and a third leg joining ends of the first and the second legs to give the conveyor the U-shape, wherein the moveable conveyor has a top side and an opposite bottom side, the bottom side of the conveyor having wheels;

a fifth plurality of stub rolls having a conveying end and an opposite mounting end with the mounting end of the fifth plurality of stub rolls rotatably mounted on the top side of the first leg of the U-shaped conveyor with the conveying end of the fifth plurality of stub rolls between the first and second legs of the moveable conveyor, and a sixth plurality of stub rolls a conveying end and an opposite mounting end with the mounting end of the sixth plurality of stub rolls rotatably mounted on the top side of the second leg of the U-shaped conveyor with the conveying end of the sixth plurality of stub rolls between the first and second legs of the moveable conveyor;

wherein the moveable conveyor is sized for end of conveyor having the third leg to move into the first opening of the first furnace with the conveying end of the fifth plurality of stub rolls aligned with the conveying end of the first plurality of stub rolls, and the conveying end of the sixth plurality of stub rolls aligned with the conveying end of the second plurality of stub rolls;

a carriage having an extended first arm and an opposite extended second arm, wherein the extended first arm is supported on the conveying end of the fifth plurality of stub rolls, and the extended second arm is supported on the conveying end of the sixth plurality of stub rolls;

wherein the carriage is moved into the first furnace by moving the first end of the conveyor into the first opening of the first furnace to align the conveying end of the first and fifth plurality of stub rolls and the conveying end of second and sixth plurality of stub rolls, activating the drive system to power the drive end of the first and the second plurality of stub rolls and moving the carriage from the conveying end of the fifth and sixth plurality of stub rolls to the conveying end of the first and second plurality of stub rolls.

This invention also relates to a glass shaping furnace, including, among other things:

a first tunnel furnace including, among other things:

a first entrance end and a first exit end;

a first heating system to heat a glass sheet passing though the first tunnel furnace to a first predetermined temperature, and a first portion of a conveying system to move the glass sheet through the first tunnel furnace from the first entrance end toward the first exit end;

a shaping furnace, including, among other things:

a second entrance end and a second exit end, wherein the second entrance end is connected to the first exit end, and a second heating system to heat the glass sheet to its shaping temperature, wherein the second heating system comprises at least one gyrotron, an optical system and a mirror system to direct the bean of the gyrotron to a predetermined area within the shaping furnace to shape a predetermined portion of the glass sheet passing through the shaping furnace, and;

a second tunnel furnace, including, among other things:

a third entrance end and a third exit end, wherein the third entrance end is connected to the second exit end;

a third heating system to controllably cool the shaped glass sheet passing though the second tunnel furnace, and a third portion of the conveying system to move the glass sheet through the second tunnel furnace from the third entrance end toward the third exit end.

The invention still further relates to a glass shaping furnace assembly including, among other things;

a first furnace positioned between and connected to a second furnace and a third furnace, and the first furnace positioned between and connected to a fourth furnace and a fifth furnace, wherein the second furnace is opposite to the third furnace and the fourth furnace is opposite to the fifth furnace, wherein the first furnace has a gyrotron assembly for shaping glass sheets, and the second, third, fourth and fifth furnaces have heating and cooling means to heat or cool glass sheets;

a first door thermally separates the interior of the first furnace from the interior of the second furnace, a second door thermally separates the interior of the first furnace from the interior of the third furnace, a third door thermally separates the interior of the first furnace from the interior of the fourth furnace, and a fourth door thermally separate the interior of the first furnace from the interior of the fifth door:

a fifth door opposite to the first door to close entrance of the second furnace, a sixth door opposite to the second door to close entrance of the third furnace, a seventh door opposite to the third door to close entrance of the fourth furnace, and an eighth door opposite to the fourth door to close entrance of the fifth furnace; and a sensor operating on an elevator mechanism to selectively open or close selected ones of the first to eighth doors to move a glass sheet through a selected one of the entrances of the second, third, fourth and fifth furnaces and into the fifth furnace.

In addition, this invention relates to a method of operating a pilot furnace to shape a glass sheet for an aircraft transparency, the method includes, among other things:

placing a flat glass sheet on a bending iron having a fixed shaping rail and a shaping rail on an articulating arm defined as a moveable shaping rail;

positioning the bending iron having the glass sheet in an interior of a furnace to heat the glass sheet to shape the glass sheet on the fixed shaping rail while moving a beam of microwave energy from a gyrotron to heat portions of the glass sheet overlaying the moveable shaping rail to shape the portions of the glass sheet by movement of the articulating arm; and controllably cooling the shaped glass sheet to anneal the shaped glass sheet.

BRIEF SUMMARY OF THE DRAWINGS

FIG. 12 is an elevated cross sectional side view of another non-limiting embodiment of a pilot furnace incorporating features of the invention that can be used in the practice of the invention to, among other things, heat and shape glass sheets.

FIG. 14 is an elevated cross sectional view of a further non-limiting embodiment of a furnace of the invention that can be used in the practice of the invention to, among other things, heat and shape glass sheets.

DETAILED DESCRIPTION OF THE INVENTION

Figure 1:
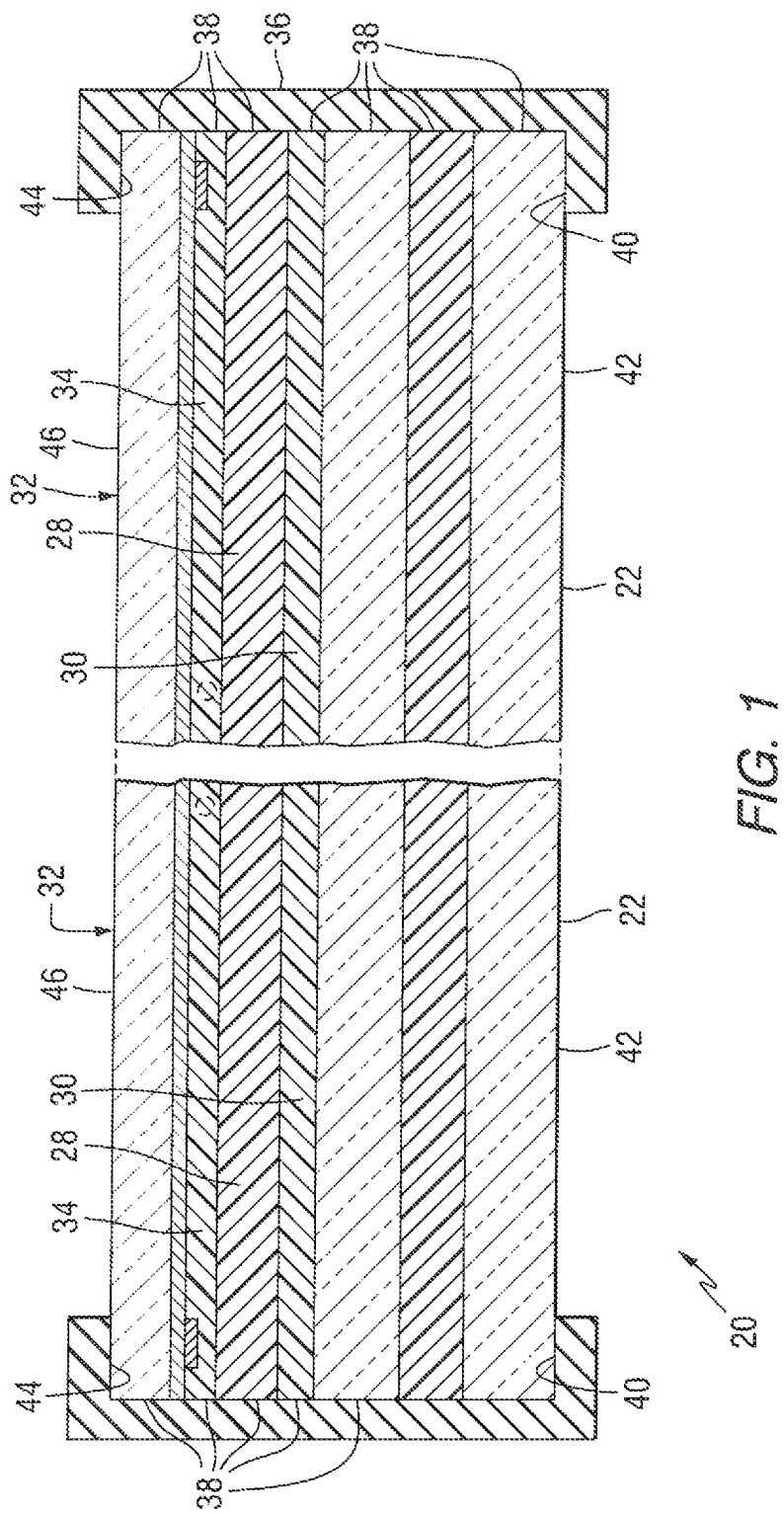
FIG. 1 is a cross sectional view of a laminated aircraft transparency illustrating the laminated structure of the transparency.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For ranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the term, "over" means on but not necessarily in contact with the surface. For example, a first substrate "over" a second substrate does not preclude the presence of one or more other substrates of the same or different composition located between the first and the second substrates.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise in the following discussion, like numbers refer to like elements.

For purposes of the following discussion, the invention will be discussed with reference to shaping a sheet for an aircraft transparency. As will be appreciated, the invention is not limited to the material of the sheet, e.g. the sheet can be, but is not limited to, a glass sheet or a plastic sheet. In the broad practice of the invention, the sheet can be made of any desired material having any desired characteristics. For example, the sheet can be opaque, transparent or translucent to visible light. By "opaque" is meant having visible light transmission of 0%. By "transparent" is meant having visible light transmission in the range of greater than 0% to 100%. By "translucent" is meant allowing electromagnetic energy (e.g., visible light) to pass through but diffusing this energy such that objects on the side opposite the viewer are not clearly visible. In the preferred practice of the invention, the sheet is a transparent glass sheet. The glass sheet can include conventional soda-lime-silica glass, borosilicate glass, or lithia-alumina-silica glass. The glass can be clear glass. By "clear glass" is meant non-tinted or non-colored glass. Alternatively, the glass can be tinted or otherwise colored glass. The glass can be annealed, heat-treated or chemically tempered. In the practice of the invention, the glass can be conventional float glass, and can be of any composition having any optical properties, e.g., any value of visible transmission, ultraviolet transmission, infrared transmission, and/or total solar energy transmission. By "float glass" is meant glass formed by a conventional float process. Examples of float glass processes are disclosed in U.S. Pat. Nos. 4,744,809 and 6,094,942, which patents are hereby incorporated by reference.

In one non-limited embodiment of the invention, the glass was a clear lithia-alumina-silica glass of the type disclosed in U.S. Pat. No. 8,062,749, and in another non-limited practice of the invention the glass was a clear soda-lime-silica glass of the type disclosed in U.S. Pat. Nos. 4,192,689; 5,565,388, and 7,585,801.

In the preferred practice of the invention, the glass sheet is used in the manufacture of shaped monolithic or shaped laminated transparencies for an aircraft. However as can be appreciated, the shaped glass sheets of the invention can be used in the manufacture of any type of transparency, such as but not limited to windshields, windows, rear lights, sunroofs and moonroofs; laminated or non-laminated residential and/or commercial windows; insulating glass units, and/or transparencies for land, air, space, above water and under water vehicles. Non-limiting examples of vehicle transparencies, residential and commercial transparencies, and aircraft transparencies and methods of making the same are found in U.S. Pat. Nos. 4,820,902; 5,028,759, 6,301,858 and 8,155,816, which patents are hereby incorporated herein by reference.

Shown in FIG. 1 is a cross-sectional view of a non-limiting embodiment of a laminated aircraft windshield 20 that has components that can be made by the practice of the invention. The windshield 20 includes a first glass sheet 22 secured to a vinyl-interlayer or sheet 28 by a first urethane interlayer 30, and the vinyl-interlayer 28 is secured to a heatable member 32 by a second urethane interlayer 34. An edge member or moisture barrier 36 of the type used in the art, e.g. but not limited to a silicone rubber or other flexible durable moisture resistant material is secured to (1) peripheral edge 38 of the windshield 20, i.e. the peripheral edge 38 of the vinyl-interlayer 28; of the first and second urethane interlayers 30, 34 and of the heatable member 32; (2) margins or marginal edges 40 of outer surface 42 of the windshield 20, i.e. the margins 40 of the outer surface 42 of the first glass sheet 22 of the windshield 20, and (3) margins or marginal edges 44 of outer surface 46 of the windshield 20, i.e. margins of the outer surface 46 of the heatable member 32.

As is appreciated by those skilled in the art and not limiting to the invention, the first glass sheet 22; the vinyl-interlayer 28 and the first urethane interlayer 30 form the structural part, or inner segment, of the windshield 20 and the outer surface 42 of the windshield 20 faces the interior of the vehicle, e.g. an aircraft (not shown), and the urethane layer 34 and the heatable member 32 form the non-structural part, or outer segment, of the windshield 20, and the surface 46 of the windshield 20 faces the exterior of the aircraft. As is appreciated by those skilled in the art, the heatable member 32 provides heat to remove fog from, and/or to melt ice on, the outer surface 46 of the windshield 20.

Figure 2:
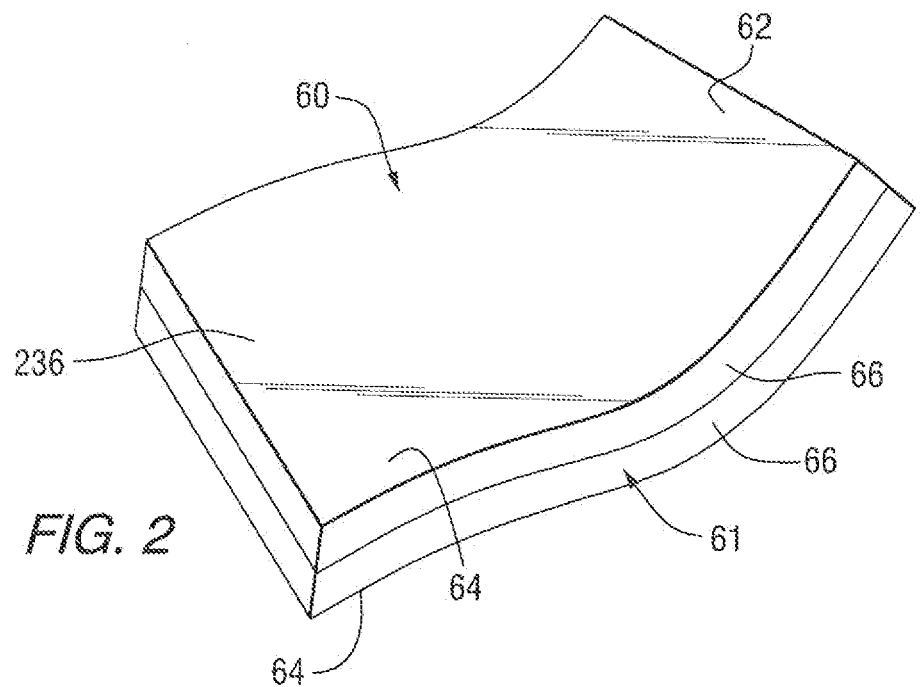
FIG. 2 is a perspective view of shaped sheets that are shaped in accordance to the teachings of the invention.
Figure 3:
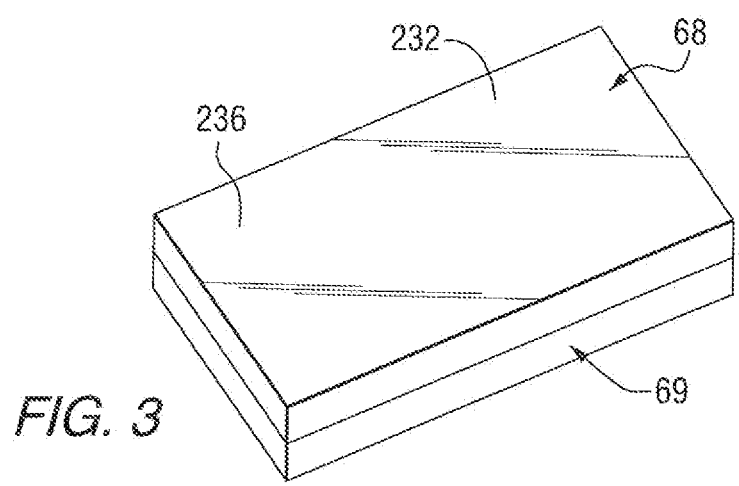
FIG. 3 is a perspective view of flat sheets that can be shape in accordance to the teachings of the invention to, among other things, provide the shaped sheets of FIG. 2.
Figure 4:
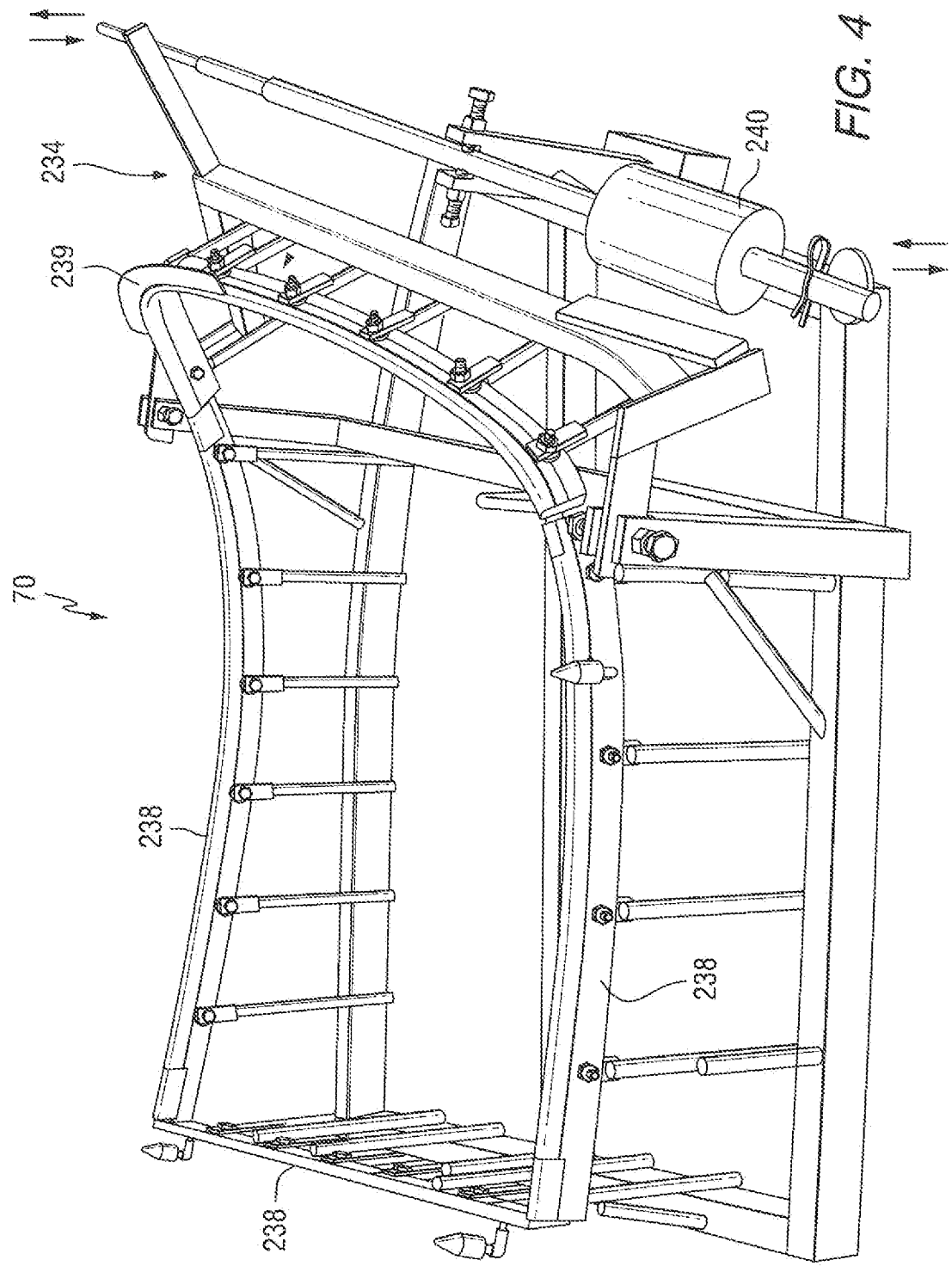
FIG. 4 is perspective view of a non-limiting embodiment of a bending device that can be used in the practice of the invention to, among other things, shape glass sheets, e.g. but not limited to the sheets of FIG. 3 to the shape sheets shown in FIG. 2.

Shown in FIG. 2, are two pieces of shaped glass sheets 60 and 61 shaped in accordance to the teachings of the invention. Each of the glass sheets 60 and 61 have curved end portions 62 and 64, and shaped intermediate portion 66. In one non-limiting embodiment of the invention, the shaped glass sheets 60 and 61 were shaped from flat glass sheets 68 and 69 shown in FIG. 3 using the bending iron 70 shown in FIG. 4. For a detailed discussion of the bending iron 70 attention is directed to USPA '494. FIG. 4 of this document correspond to FIG. 4, respectively of USPA '494. As can be appreciated, the invention is not limited to the bending iron 70 and any design of a bending iron can be used in the practice of the invention to shape one sheet or simultaneously shape two sheets 68 and 69 (see FIG. 3), or shape more than two sheets to any desired shape.

Figure 5:
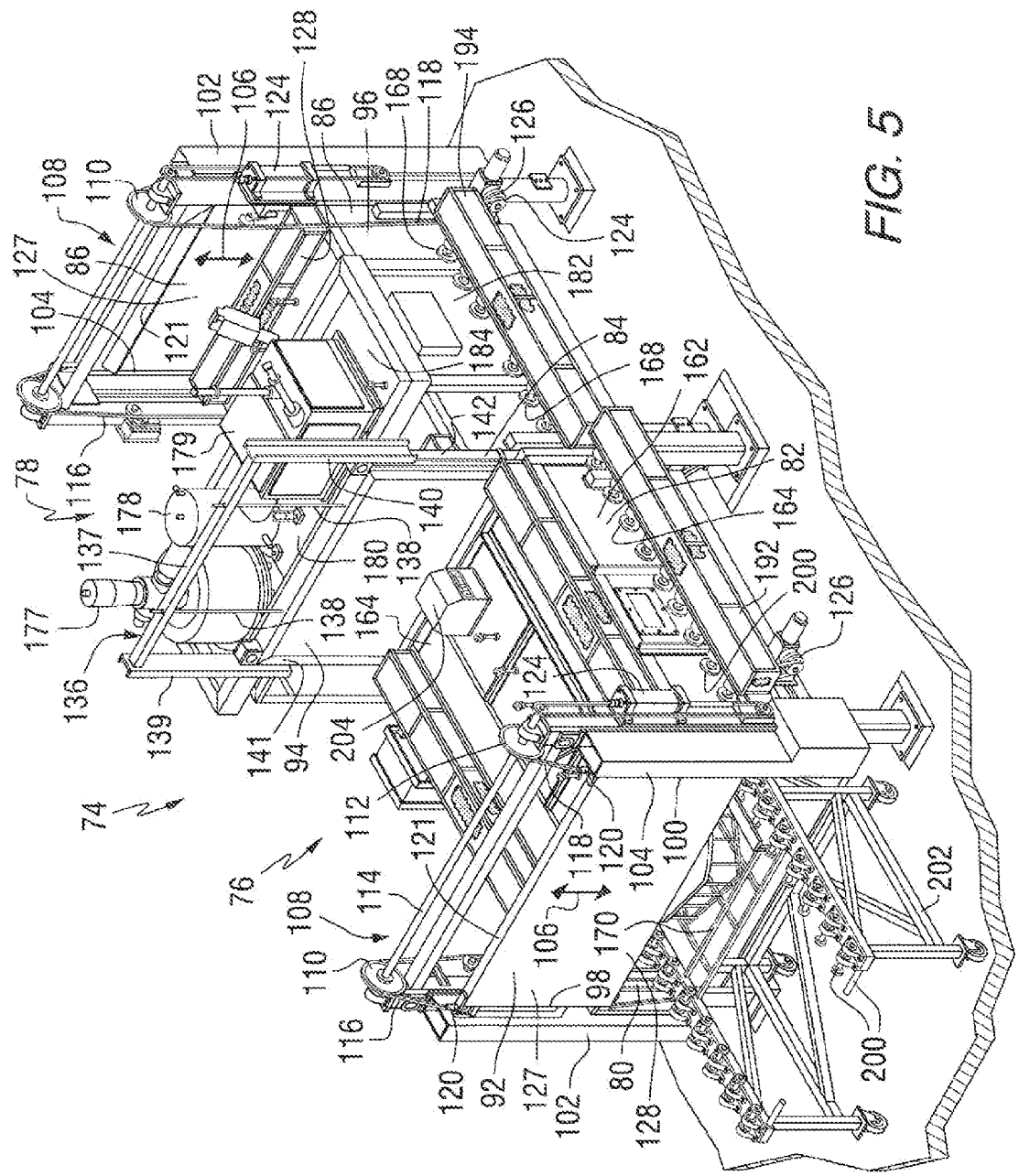
FIG. 5 is perspective view of a non-limiting embodiment of a pilot furnace that can be used in the practice of the invention to, among other things, heat and shape glass sheets, e.g. but not limited to, heating and shaping the sheets of FIG. 3 to the shaped sheets shown in FIG. 2 in accordance to the teachings of the invention.
Figure 6:
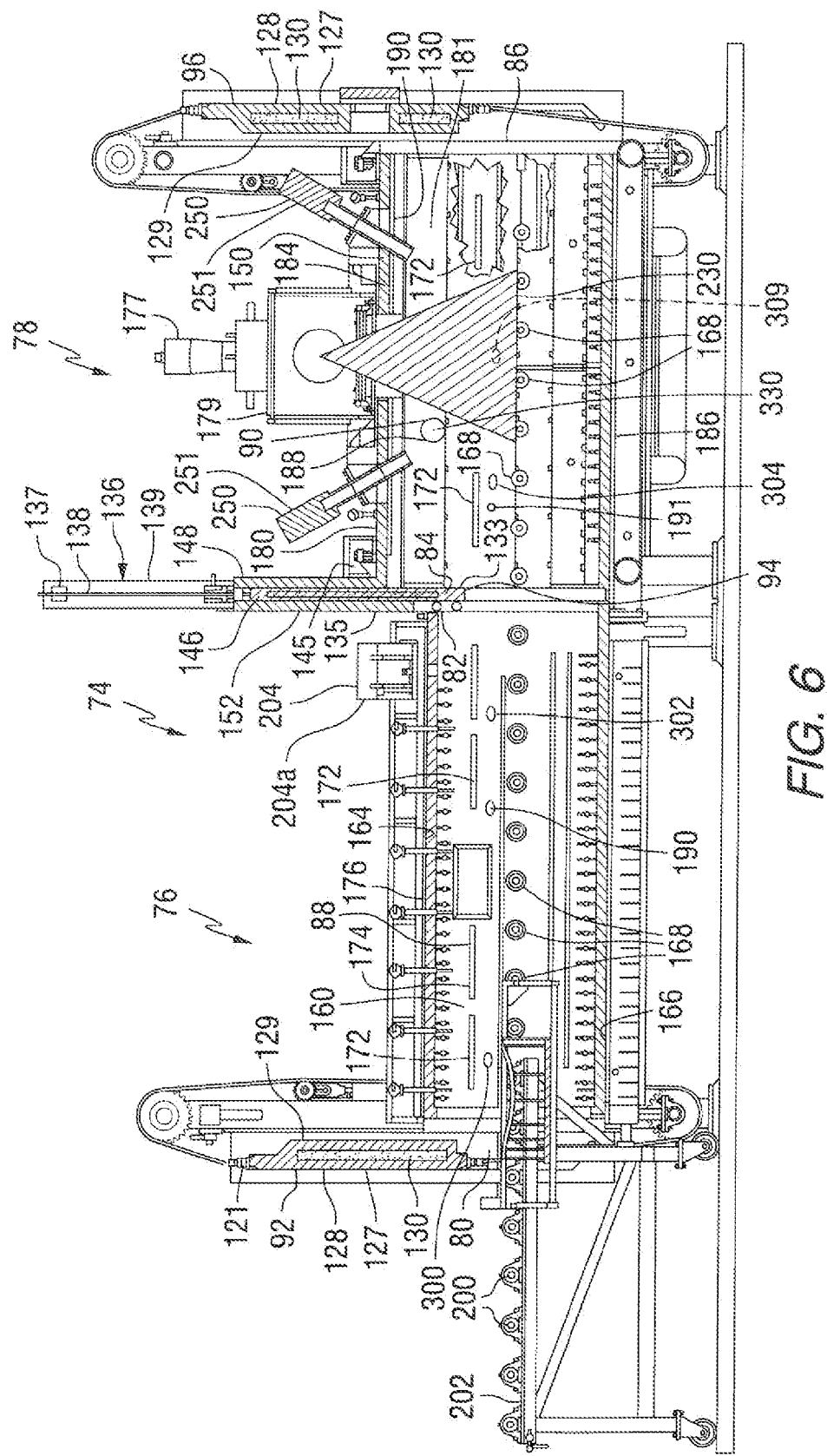
FIG. 6 is an elevated cross sectional view of the furnace shown in FIG. 5.

FIGS. 5 and 6 show a non-limiting embodiment of a furnace, e.g. but not limited to a pilot furnace, or apparatus 74 of the invention for heating and shaping glass sheets, e.g. but not limited to the shaped glass sheets 68 and 69. The furnace 74 includes a first chamber or furnace 76 and a second chamber or furnace 78. The first chamber 76 preheats a glass sheet, e.g. but not limited to the flat glass sheet 68 or flat glass sheets 68 and 69 (see FIG. 3), supported or positioned on the bending iron 70 (FIG. 4), and controllably cools the shaped glass sheet, e.g. but not limited to the shaped glass sheet 60 or shaped glass sheets 60 and 61 (FIG. 2), supported or positioned on the bending iron 70 to anneal the shaped glass sheets. The second chamber 78 selectively heats portions of the flat glass sheets 68 and 69 in accordance to the teachings of the invention to shape the glass sheets 68 and 69 to a desired shape, e.g. but not limiting to the invention, to the shape of the shaped glass sheets 60 and 61 shown in FIG. 2.

The first chamber 76 has a first opening 80 (also referred to as the "entrance 80" of the first chamber 76) and a second opening 82 (also referred to as the "exit 82" of the first chamber 76) opposite to and spaced from the first opening 80 (second opening clearly shown in FIG. 6). The second chamber 78 has a first opening 84 (also referred to as the "entrance 84" of the second chamber 78) and a second opening 86 (also referred to as the "exit 86" of the second chamber 78) opposite to and spaced from the first opening 84 of the second chamber 78. With this arrangement, the flat sheets 68 and 69 supported on the bending iron 70 are moved through the first opening 80 of the first chamber 76 into interior 88 (see FIG. 6) of the first chamber 76 to preheat the glass sheets 68 and 69. The preheated glass sheets 68 and 69 are moved through the second opening 82 of the first chamber 76 and through the first opening 84 of the second chamber 78 into interior 90 (see FIG. 6) of the second chamber 78 to controllably heat the glass sheets 68 and 69 to shape the glass sheets in accordance to the teachings of the invention. The heated shaped glass sheets 60 and 61 are moved from the interior 90 of the second chamber 78 through the first opening 84 of the second chamber 78 and the second opening 82 of the first chamber 76 into the interior 88 of the first chamber 76 to controllably cool the shaped glass sheets. Thereafter the shaped glass sheets 60 and 61 are moved from the interior 88 of the first chamber 76 through the first opening 80 of the first chamber 76.

The interior 88 of the first chamber 76 and the interior 90 of the second chamber 78 are separated from one another and from the environment exterior of the furnace 74 by providing a door 92 at the entrance 80 of the first chamber 76, a door 94 at the entrance 84 of the second chamber 78 and a door 96 at the exit 86 of the second chamber 78. As can be appreciated, the invention is not limited to the type of doors 92, 94, 96 provided at the entrance 80, entrance 84 and exit 86, respectively, and any door design and/or construction can be used in the practice of the invention. In one non-limiting embodiment of the invention the doors 92 and 96 were similar in design and construction. In view of the forgoing, the discussion is now directed to the design and construction of the door 92 with the understanding that the discussion unless indicated otherwise is directed to the door 96. With reference to FIG. 5, the door 92 had sides 98 and 100 mounted in tracks 102 and 104 for reciprocal vertical movement to move upward to open the entrance 80, and to move downward to close the entrance 80, of the chamber 76, and for the door 96 to move upward to open the opening 86, and to move downward to close the opening 86. The opening 86 of the furnace 78 is used for, among other things, making repairs to, and performing maintenance on, the furnace 78; cleaning out the interior 90 of the furnace 78, e.g. but not limited to removing broken glass, and for expansion of the furnace 74 discussed in detail below.

The doors 92 and 96 were moved along the reciprocating vertical path designated by double arrow headed line 106 by a pulley arrangement 108 including a pair wheels 110 and 112 spaced from one another and mounted on a rotating shaft 114. Cables 116, 118 had one end 120 secured to top side 121 adjacent to the sides 98, 100 of the doors 92 and 96, respectively (clearly shown for door 92) and opposite end 122, 124 of the cables 116, 118 respectively connected to an air cylinder 126 (clearly shown for doors 92 and 96 in FIG. 5).

In one non-limiting embodiment of the invention, the doors 92 and 94 were each made of an outer metal housing 127 having one side 128 made of steel, and the opposite side 129 facing the interior of its respective one of the furnaces made of stainless steel. The interior of the housing 127 was filled with Kaowool insulation 130 (clearly shown in FIG. 5).

The shaped glass sheets 60 and 61 were moved into the first furnace and annealed. The method of annealing glass sheets is well known in the art, e.g. see U.S. Pat. No. 7,240,519, which patent in its entirety is hereby incorporated by reference, and no further discussion is deemed necessary. After the sheets are annealed, the door 92 was lifted and the shaped glass sheets were removed from the first furnace 76. The temperature differential between the first furnace 76 and the second furnace 78 when the shaped glass sheets 60 and 61 are removed from the first furnace 76 can reach temperatures in the range of 800-1000° F. More particularly, the temperature of the first furnace 76 can be as low as 200° F., the temperature the annealed shaped glass sheets 60 and 61 are removed on the moveable conveyor 202 from the first furnace 76, whereas the temperature of the second furnace 78 can be greater than 1000° F., the glass preheat temperature. To reduce heat loss between the first and the second furnaces 76 and 78, respectively, the door 94 in the preferred practice of the invention has a thermal conductivity of less than 0.80 BTU/(hr·ft□° F.).

Figure 7:
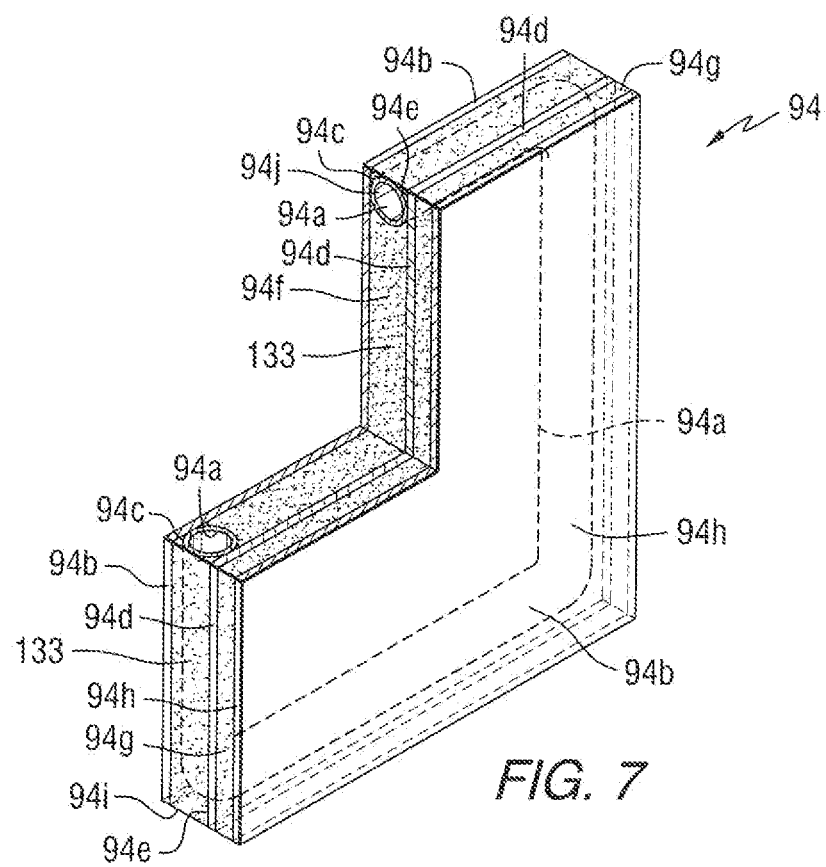
FIG. 7 is a perspective view of a furnace door having portions removed for purposes of clarity incorporating features of the invention to reduce heat loss between adjacent interiors of the pilot furnace shown in FIGS. 5 and 6; the furnace door having portions removed for purposes of clarity.

With reference to FIG. 7, in one non-limiting embodiment of the invention, the door 94 includes a pipe frame 94a having a stainless steel 11 gage sheet 94b secured to side 94c of the pipe frame 94a and a stainless steel 11 gage sheet 94d secured to side 94e of the pipe frame 94a. A layer 133 of a low density high temperature insulating material sold under the registered trademark Super Firetemp® M having a thickness of 1½ inches was provided within the pipe frame 94a between the stainless steel sheets 94b and 94d. A layer 94g of insulating material, e.g., marinigie was provided over the steel sheet 94d and covered with 0.008-0.010 inch thick stainless steel foil 94h. The door 94 was mounted with the stainless steel sheet 94h facing the interior of the furnace 78. In the preferred practice of the invention opening 94i and 94j are connected to compressor (not shown) to move room temperature compressed air through the pipe from 94a to cool the door 94 to prevent warpage of the pipe frame 94a and sheets 94b and 94d. Optionally, the peripheral edge of the layers 94g is covered by the foil 94h.

The door 94 is connected to a vertically reciprocating inverted U shaped member 136 (clearly shown in FIG. 5). More particularly, the door 94 was connected to middle leg 137 of the U-shaped member 136 by rods 138, and outer legs 139 and 140 were mounted for reciprocal vertical movement in vertical tracks 141 and 142, respectively (see FIG. 5) in any convenient manner. In the preferred practice of the invention, the U-shaped member was moved vertically upward and downward by electric motor 145 (shown only in FIG. 6). With the door 94 in the down position, the entrance 84 of the furnace 78 is closed, and with the door 94 in the up position, the entrance 84 of the furnace 78 is opened. In the up position as shown in FIG. 6, the door 94 is moved into an envelop 146 formed on one side by a vertical extension 148 of metal roof 150 of the furnace 78 (see FIG. 6) and other side 152 of the envelope 146 is made of a ceramic or metal wall secured between the tracks 140 and 142 (see FIG. 5).

The design and construction of the first furnace 76 is not limiting to the invention and any type of furnace for heating or preheating a glass sheet to a desired temperature, e.g. a temperature below the softening temperature of the flat glass sheets 68 and 69 to avoid marring of the surface of the glass sheets and for controllably cooling the shaped glass sheet, e.g. but not limited to the shaped glass sheets 60 and 61 in the manner discussed below. More particularly, a preheat temperature in the range of 600-900° F. was provided for a lithium-soda-lime glass sheet, and a preheat temperature in the range of 900-1025° F. was provided for a soda-lime-silica glass sheet. In one non-limiting embodiment of the invention, the first furnace 76 included side wall 160 (see FIG. 6) and opposite sidewall 162 (see FIG. 5), a top wall or ceiling 164 and a bottom wall 166 to provide the interior 88 of the furnace 76. Stub rolls 168 extended through the sidewalls 160 and 162 into the interior 88 of the first furnace 76 for moving a carriage 170 (see FIG. 8) into and out of the interior 88 of the first furnace 76, in a manner discussed below. The infrared heaters 172 were provided on interior surface 174 of the sidewalls 160 and 162 (only sidewall 162 shown and shown only in FIG. 6), interior surface 176 of the ceiling 164 and the bottom wall 166 to heat the interior 82 of the first furnace 76 to the desired temperature.

The design and construction of the second furnace 78 is not limiting to the invention and any type of furnace for heating a glass sheet to a desired temperature, e.g. but not limiting to the invention, a heating temperature in the range of 600-900° F. for a lithium-soda-lime glass sheet, and a heating temperature in the range of 900-1025° F. for a soda-lime-silica glass sheet. In the preferred non-limited embodiment of the invention, portions of the glass sheet to be shaped, e.g. but not limited to the shaped glass sheets 60 and 61 (see FIG. 2) were heated to their higher shaping temperatures using microwave energy generated by a gyrotron. With reference to FIGS. 5 and 6, there is shown a gyrotron 177, an optical box 178 and a mirror box 179 mounted on roof 180 of the second furnace 78. The operation of the gyrotron 177, optical box 178 and mirror box 179 are discussed in greater detail below.

In the non-limiting embodiment of the invention under discussion, the second furnace 78 is similar in construction to the first furnace 76, and includes a side wall 180 (see FIG. 6) and opposite sidewall 182 (see FIG. 5), a top wall or ceiling 184 and a bottom wall 186 (see FIG. 6) to provide the interior 90 of the furnace 78. The stub rolls 168 (see FIG. 6) extend through the sidewalls 180 and 182 into the interior 90 of the second furnace 78 for moving the carriage 170 (see FIG. 7) into and out of the interior 90 of the second furnace 78, in a manner discussed below. In one non-limiting embodiment of the invention, the infrared heaters 172 were provided on interior surface 188 of the sidewalls 180 and 182 (the sidewall 180 shown in FIG. 6 and the sidewall 182 shown in FIG. 5), interior surface 190 of the ceiling 184 and the bottom wall 186 to heat the interior 90 of the second furnace 78 to a desired temperature. For a lithium-aluminum-silicate glass sheets, the interior 90 of the furnace 78 was heated to a temperature within the range of 600-900° F. and for soda-lime-silicate glass sheets, the interior 90 of the furnace 78 was heated to a temperature within the range of 900-1000° F. Generally, but not limiting to the invention, the preheat temperature of the furnace 76 and the temperature of the furnace 78 with the gyrotron de-energized are similar such that the temperature attained by the glass sheets in the furnace 76 is maintained in the furnace 78.

The temperature of the interiors 88 and 90 of the furnaces 76 and 78, respectively was measured by thermocouples 190 and 191. The thermocouples 190 and 191 forwards a signal to a microprocessor 193 (see FIG. 9). The microprocessor 193 acts on the signal to determine the temperature of the interiors 88 and 90 of the furnaces 76 and 78, respectively. If the temperature of one or both of the furnace interiors is (are) below a set temperature, a signal is forwarded along line 195 to increase the heat input of the furnace. On the other hand, if the temperature of one or both of the furnace interiors 88 and 90 is (are) too high, a signal is forwarded along the line 195 to decrease the heat input to the furnace. If the temperature of the furnace interior is in an acceptable range no action is taken.

The conveyor system for the furnace 74 includes the stub conveyor rolls 168 of the first furnace 76 driven by a gearing arrangement 192 (see FIG. 5) including a shaft for rotating the stub rolls and a motor to power the shaft (the shaft and motor of the gearing arrangement 192 are not shown), and includes the stub conveyor rolls 168 of the second furnace 78 driven by a gearing arrangement 194 (see FIG. 5) including a shaft for rotating the stub rolls and a motor to power the shaft, the shaft and motor of the gearing arrangement 194 are not shown. As is appreciated by those skilled in the art, conveyors using stub rolls are well known in the art and no further discussion is deemed necessary.

With reference to FIGS. 3-8, as needed, in one non-limiting embodiment of the invention, at a loading station (not shown) one or more glass sheets were positioned on a bending iron, e.g. the bending iron 70 shown in FIG. 4. In this embodiment of the invention, two glass sheets, e.g. the glass sheets 68 and 69 (see FIG. 3) were positioned on the bending iron 70, optionally ceramic dust (not shown) can be used to prevent sticking of the shaped glass sheets 60 and 61. The bending iron 70 having the sheets 68 and 69 was position on the carriage 170 (FIG. 8) and the carriage 170 was placed on stub rolls 200 of a moveable conveyor 202. The moveable conveyor 202 was moved from the loading area to the furnace area. The door 92 of the first furnace 76 was opened (see FIGS. 5 and 6) and the moveable conveyor 202 was moved into the opening 80 to align the stub rolls 200 of the moveable conveyor 202 with the stub rolls 168 of the first furnace 76. The carriage 170 was then moved into engagement with adjacent stub rolls 168 of the first furnace 76, and the carriage 170 was moved into the interior 88 of the furnace 76 by the stub rolls 168 of the first furnace 76. The rotation of the stub rolls 168 was stopped when the carriage 170 was in the predetermined position in the interior 88 of the first furnace 76, which is usually the hottest position in the first furnace 76. After the rotation of the stub rolls 168 stops, the carriage 170 having the bending iron 70 and the glass sheets 68 and 69 remained in the first furnace 76 until the glass sheets 68 and 69 reach the desired temperature, e.g. the temperature for a lithium-aluminum-silicate glass was within the range of 600-900° F., and the temperature for a soda-lime-silica glass was within the range of 900-1000° F. Optionally, the carriage 170 can be moved slightly upstream and downstream along the conveyor movement path to circulate the heated air in the furnace around the sheets 68 and 69.

The temperature of the glass sheets can be monitored in any convenient manner, e.g. the temperature of the glass sheets 68 and 69 were monitored by a land pyrometer 204 mounted on the roof 164 of the first furnace 76 (see FIG. 5). More particularly, a pyrometer 204, e.g. but not limited to a Land Linscanner measured the temperature of the glass as the carriage 170 moved toward the door 94 separating the furnaces 76 and 78. A signal was forwarded along line 204A to the microprocessor 193 (see FIG. 9). If the temperature of the glass is within an acceptable preheat temperature range, e.g., at a temperature below the preheat temperature, the carriage 170 is moved into the furnace 78. If the glass is not within the acceptable shaping temperature range the carriage 170 is not moved into the shaping furnace 78 and appropriate action, e.g. but not limited to increasing the temperature of the furnace 76 if the glass temperature is too low or decreasing the temperature of the furnace 76 if the glass temperature is too high, is taken.

After the glass sheets 68 and 69 reached the desired temperature, the door 94 of the second furnace 78 was opened, and the stub rolls 168 of the first furnace 76 and the second furnace 78 were energized to move the carriage 170 through the opening 84 of the second furnace 78 to a designated shaping position in the interior 90 of the second furnace 78 to be discussed in detail below. The door 94 of the second furnace 78 can be closed at anytime after the carriage 170 has passed into the interior of the second furnace 78. After the carriage 170 having the glass sheets 68 and 69, and the bending iron 70 was positioned in the designated shaping position in the interior 88 of the second furnace 78, or the carriage 170 cleared the door 94 as discussed below, the door 94 was closed, and the shaping process of the invention using the gyrotron 177 discussed in detail below was practiced.

After the glass sheets 68 and 69 were shaped, the gyrotron 177 was de-energized or deactivated, and the door 94 of the second furnace 78 was opened. The stub rolls 168 of the first and the second furnaces 76 and 78, respectively were energized to move the carriage 170 having the shaped sheet 60 and 61 from the interior 90 of the second furnace, through the opening 84 of the second furnace 78 into the interior 88 of the first furnace 74. After the carriage 170 was moved into the interior 88 of the first furnace 76, the door 94 of the second furnace 78 was closed. The shaped glass sheets were controllably cooled to anneal the sheets. When the annealing process was completed, the door 92 of the first furnace 76 was opened and the moveable conveyor 202 (see FIG. 8) was moved into the opening 80 of the first furnace 76 into alignment with the stub rolls 168 of the first furnace 76. The stub rolls 168 of the first furnace were energized to move the carriage 170 out of the interior 88 of the first furnace 76 onto the moveable conveyor 202. The moveable conveyor having the carriage 170 was moved to an unload station (not shown) and the shaped glass sheets were removed from the bending iron 70 in any usual manner.

The discussion is now directed to using the gyrotron 177 (see FIGS. 5, 6 and 10 as needed) to heat portions of one or more glass sheets to their bending or shaping temperature. As previous discussed, glass for aircraft transparencies are made using the cut-after-bend process to remove portions of the glass sheets having optical distortions, e.g. but not limiting thereto resulting from long periods of time required for the glass sheets to rest on the bending iron to attain the desired temperature for bending. For example and not limiting to the invention, it is expected that the time period for heating flat glass sheets to their shaping temperature can be reduced by 30-40% using a gyrotron to heat selected portions of the glass sheets to their bending or shaping temperature. As can now be appreciated, it is expected that the reduction in the heating period of 30-40% will reduce, if not eliminate, marring of the glass sheet in contact with the bending iron and make it possible to shape glass sheets for aircraft transparencies using the cut-to-size process instead of the cut-after-bend process.

Figure 10:
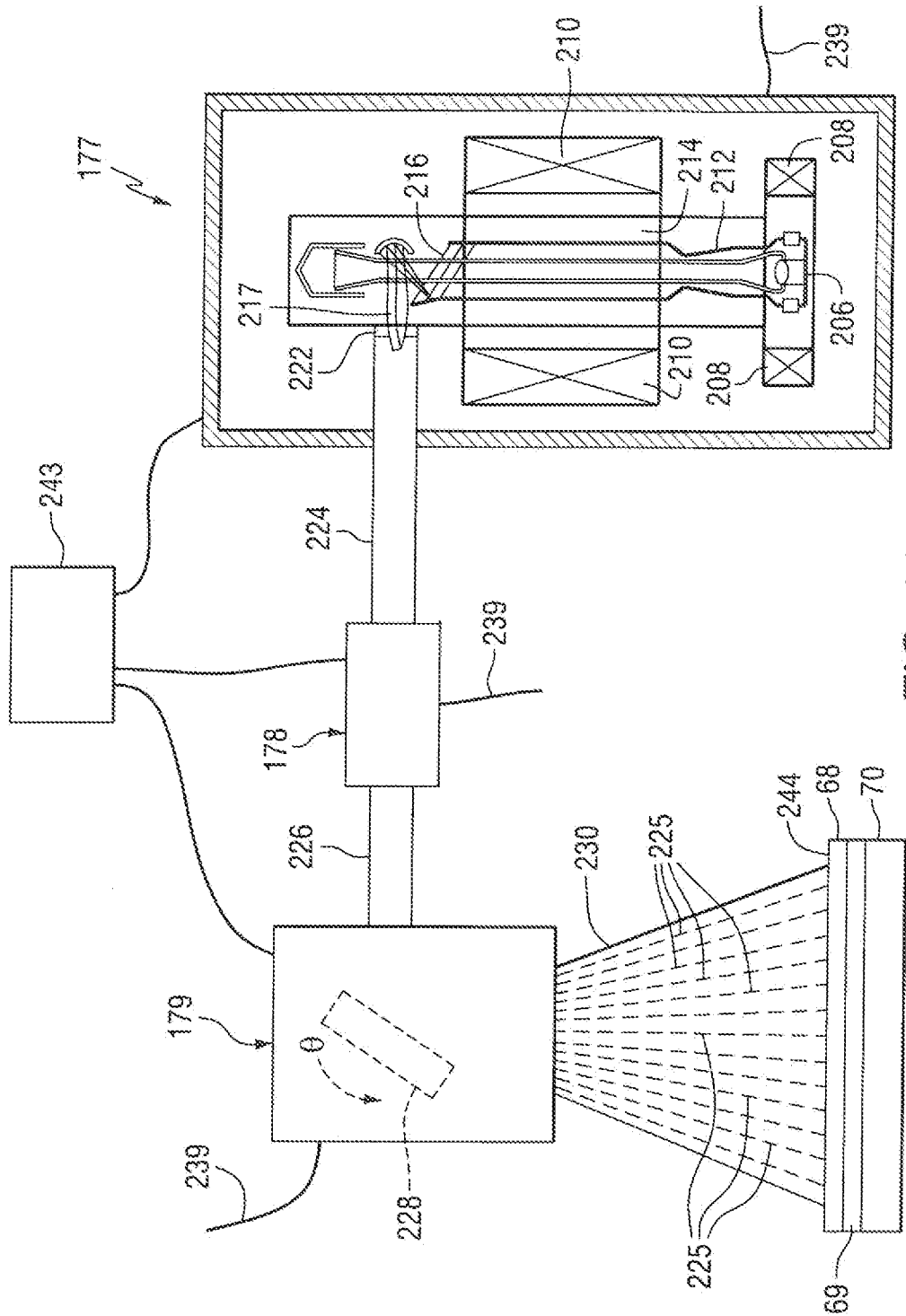
FIG. 10 is a schematic partially in cross section showing a gyrotron that can be used in the practice of invention to heat selected portions of a glass sheet.

As is known in the art, a gyrotron is a vacuum electronic device capable to generate high-power, high-frequency Terahertz (THz) radiation. Its operation is based on the stimulated cyclotron radiation of electrons oscillating in a strong magnetic field typically provided by a superconducting magnet. A schematic, indicating the various parts of the gyrotron 177 is shown in FIG. 10. In general and not limiting to the invention, in the operation of the gyrotron 177, electrons that are emitted by a cathode 206 surrounded by gun coil magnets 208, are accelerated in a strong magnetic field of a superconducting magnet 210. While an electron beam 212 travels through the intense magnetic field 210, the electrons start to gyrate at a specific frequency given by the strength of the magnetic field. In a cavity 214, located at the position with the highest magnetic field strength, the THz radiation is strongly amplified. Mode converter 216 is used to form free-gaussian beams (217) that leave the gyrotron 177 through a window 222 and is coupled to a waveguide 224. Gyrotrons are well known in the art and no further discussion is deemed necessary. The gyrotron used in the practice of the invention was of the type sold by Gyrotron Technology, Inc. of Philadelphia, Pa.

Figure 8:
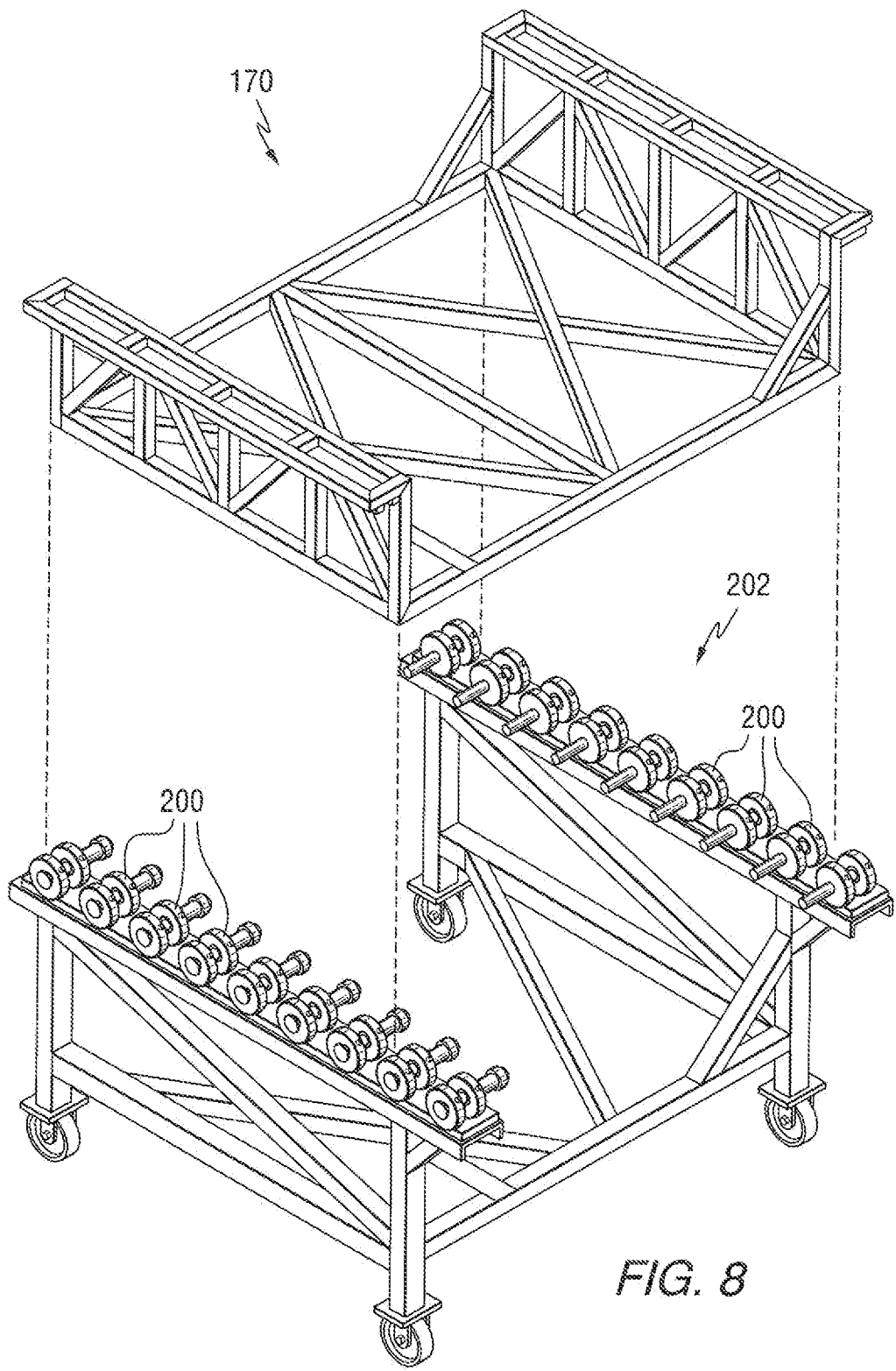
FIG. 8 is a perspective view of a carriage for supporting the bending iron, e.g. but not limited to the bending iron shown in FIG. 4 and a moveable conveyor section to move the carriage into the entrance end of the furnace shown in FIGS. 5 and 6.

With continued reference to FIG. 10, the free-gaussian beams 217 pass through the waveguide 224 to the optical box 178. The optical box 178 has mirrors (not shown) arranged as is known in the art to collimate the free-gaussian beams 217 into a single beam 225 and control the size, e.g. the diameter of the beam 225. The collimated beam 225 leaves the optical box 178 through waveguide 226 and passes into the mirror box 179. The mirror box 179 has one or more moveable mirrors 228 (one mirror shown in phantom in FIG. 10) to move the beam 225 through a predetermined area defined by cone 230 (see FIGS. 6 and 10). In FIG. 8 the beams 225 moving through the cone 230 are incident on the flat glass sheet, e.g. the flat glass sheets 68 and 69 positioned on a bending iron, e.g. the bending iron 70 (FIG. 4). The sheets 68 and 69, and the bending iron 70 are shown in block diagram in FIG. 10.

The discussion is now directed to using the beam 225 from the gyrotron 177 to heat portions 232 of the flat glass sheets 68 and 69 (see FIG. 3) that are shaped by articulating arm 234 of the bending iron 70 (FIG. 4) and portions 236 shaped by the fixed shaping rail 238 of the bending iron 70. In general, the flat glass sheets 68 and 69 positioned on the shaping rail 239 of the articulating arm 234 maintain the articulating arm 234 in a down position as viewed in FIG. 4, which maintains weight 240 in the up position. As the portion 232 of the glass sheets 68 and 69 overlaying the shaping rail 239 of the articulating arm 234 of the bending iron 70 is heated to the shaping temperature of the glass sheets 68 and 69, the weight 240 moves down, moving the articulating arm 234 upward to shape the portion 232 of the glass sheet 68 and 69 to the shape 232 shown on the sheets 60 and 61 in FIG. 2. For a more detailed discussion of the operation of the articulating arm 234 of the bending iron 70 reference should be made to USPA '494. The portions 236 of the flat glass sheets 68 and 69 are shaped by the fixed shaping rails 238 to the portions 236 of the shaped glass sheets 60 and 61. In the practice of the invention, the portions 232 and 236 of the glass sheets 62 are heated by the beams 225 from the gyrotron 177 to quickly reach the bending temperature in the range of 1000 to 1100° F. for lithium-aluminum-silicate glass and in the range of 1100 to 1200° F. for soda-lime-silicate-glass.

Figure 11:
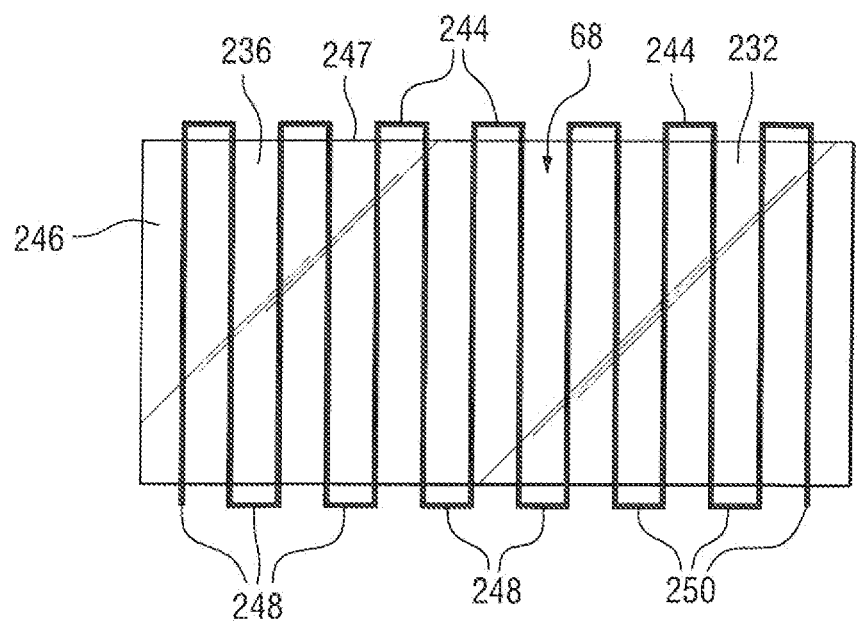
FIG. 11 is a plan view showing the path of the microwave beam of the gyrotron to selectively heat portions of a stack of one or more glass sheets.
Figure 9:
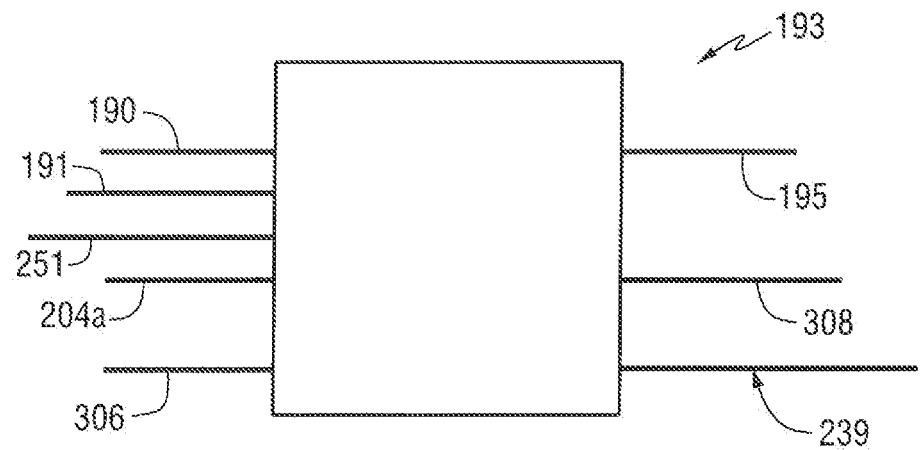
FIG. 9 is a sketch showing a microprocessor for receiving signals from sensors and acting on the signals in accordance to the teachings of the invention.

The microprocessor or computer 193 (FIG. 9) was programmed e.g., but not limited to a signal sent along wire 239, to control the operation of the mirrors of the optical box 178 to set the size of the beam 225 incident on the portions of the glass sheets being shaped; the movement of the mirror 228 of the mirror box 179 to control the direction of movement and speed of movement of the beam 225 in the zone 230 (see FIG. 10), and the energy of the beam 225 by altering the anode voltage, strength of the magnetic field and/or the voltage applied to the system of the gyrotron. With reference to FIGS. 9 and 10 as needed, the mirror 228 operated by the microprocessor 193 moves the beam 225 along a predetermined path 244 on surface 246 of the top glass sheet, e.g. top glass sheet 68 facing the mirror box 179 (see also FIG. 11). The energy beam 225 as it moves along the path 244 in the area of the sheets designated by the number 236, heats the glass sheets to their softening temperature for the glass sheets to take the shape of the fixed shaping rail 238 (see FIG. 4). The energy beam 225 as it moves along the path 244 in the area of the sheets designated by the number 232 (see FIG. 11) heats the glass sheets to their shaping temperature, at which time the articulating arm 234 of the bending iron 70 shapes the sheets in the area 232. Mounted through the roof 180 of the furnace 78 on each side of the mirror box 177 are pyrometers 250, e.g. but not limited to land pyrometers 250 (see FIG. 6) to monitor the temperature of the glass. The pyrometers 250 are connected to the microprocessor or computer 193 by wire 251 to send a signal to the microprocessor 193, and the microprocessor forwards a signal along the wire 239 to maintain the temperature of the selected portions of the glass within a desired temperature range by altering the speed of the beam 225 along the path 244 and by altering the energy of the beam as discussed above. More particularly, decreasing the speed of the beam 225 increases the temperature of the glass and visa verse, and increasing the anode voltage, the magnetic field, and/or the applied voltage increases the temperature of the glass and visa verse.

The following is a non-limited embodiment of the invention to shape a glass sheet for use in the manufacture of an aircraft transparency. The flat glass sheets 68 and 69 (FIG. 3) were positioned on the bending iron 70 (FIG. 4) and the bending iron 70 placed in the carriage 170 (FIG. 7) and the carriage placed on the stub rolls 260 of the conveyor 202. The carriage 170 having the bending iron 70 and glass sheet 68 was moved into the interior 88 of the first furnace 76 (FIG. 6) by the stub rolls 168 of the first furnace 76. The glass sheets in the closed interior of the first furnace 76 is heated to a temperature below the softening point temperature of the glass. Thereafter the carriage 170 having the heated glass sheets 68 and 69 is moved by the stub rolls 168 of the first furnace 76 and the second furnace 78 into the interior 90 of the second furnace 78 and positioned within the area of the cone 230 (see FIGS. 6 and 10).

The temperature of the interior 90 of the second furnace 78 is generally the same temperature as the interior 88 of the first furnace 76, i.e. a temperature below the shaping temperature of the glass sheets on the bending iron 70. At this temperature the glass sheets positioned on the bending iron have not been shaped. After the carriage 170 positions the sheet within the cone 230, the gyrotron 177, the optical box 178 and the mirror box 179 are energized to move the beam 225 along the path 244 (see FIG. 10). As the beam 225 moves along the scan path 244, the gyrotron 177 is in a work mode. The energy beam 225 as it moves along the path 244 in the area of the sheets designated by the number 236, heats the glass sheets to their softening temperature for the glass sheets to take the shape of the fixed shaping rail 238 (see FIG. 4). The energy beam 225 as it moves along the path 244 in the area of the sheets designated by the number 232 (see FIG. 9) heats the glass sheets to their shaping temperature, at which time the articulating arm 234 of the bending iron 70 shapes the sheets in the area 232. As the beam moves along the segments 250 of the scan path the beam is in the work mode to heat the segment 232 of the sheet 68. As the segment or portion 232 of the sheet 68 is heated the sheet segment softens and the weight 240 of the bending iron moves the articulating rail 238 upward to shape the portion 232 of the sheet 268. After the sheets were shaped, power to the gyrotron 177 is reduced or disconnected to put the gyrotron and beam 225 in the idle mode.

The stub rolls 168 of the second and first furnaces 78 and 76, respectively move the carriage 170 having the shaped sheets 60 and 61 from the interior 90 of the second furnace 78 into the interior 88 of the first furnace 76. The shaped sheets in the first furnace 76 are controllable cooled to anneal the shaped glass sheets. Thereafter the carriage 170 is moved by the stub rolls 168 of the first furnace 76 onto the moveable conveyor 202, and the moveable conveyor moved to an unload area (not shown).

As can now be appreciated, care is exercised to make certain the carriage 170 (see FIG. 9) is moved into the furnaces 76 and 78, and between the furnaces 76 and 78 when the doors 92 and 94 (see FIGS. 5 and 6) are open. As a safety feature, tracking sensors 300, 302 and 304 were used to track the position of the carriage 170 as It moved through the furnaces 76 and 78. Although not limiting to the invention, each of the tracking sensors 300, 302 and 304 included a generated continuous light beam, e.g. but not limited to a laser generated beam of light incident on a detector. When the carriage 170 moved through the continuous light beam, the beam was directed away from the detector and the detector sends a signal along a cable 306 to the microprocessor 193 indicating that the light beam was not incident on the detector. The microprocessor 193 sends a signal along wire 308 to open or close the door 92 or the door 94. By way of illustration and not limiting to the invention, the tracking detector 300 was positioned in the furnace 76 spaced from the door 92 a distance greater than the width of the carriage 170. The travel of the beam of light was transverse to the path of travel of the carriage 170. As the carriage 170 moved into the furnace 76, the carriage 170 interrupted the light beam by directing the beam away from the detector of the sensor 300. The detector of the tracking sensor 300 sent a signal along the cable 306 to the microprocessor 193 indicating that the light beam is not impinging on the detector and the microprocessor sends a signal along cable 308 to energize the motor 124 (see FIG. 5) to close the door 92.

Optionally, the glass sheets 68 and 69 are heated as the carriage 170 moves through the furnace 76, or the glass sheets 68 and 69 are moved to the center of the furnace and stopped to heat the sheets. After the glass sheets are heated, the glass sheets 68 and 69 (see FIG. 3) and the carriage 170 were moved toward the door 94 separating the furnaces 76 and 78. The carriage interrupts the light beam of the sensor 302 and a signal was forwarded along the cable 308 to microprocessor 193 to energizer the motor 145 to raise the door 94. The system is timed such that the carriage 193 can continuously move from the furnace 76 into the furnace 78 without any interruptions. The carriage 193 moves into the furnace 78 and after completely entering the furnace 78 interrupts the light beam of the sensor 304. The sensor 304 forwards a signal along cable 308 to the microprocessor 193 to close the door 94; the microprocessor 193 forwards a signal along the cable 308 to energize the motor to close the door 94. The carriage 170 is moved into the shaping position and the conveyor stopped. As can be appreciated the distance from the shaping position to the beam of light of the detector 304, and the speed of the carriage 170 are known, and in this fashion the motion of the conveyor can be stopped when the carriage and the glass sheets are in the shaping position. In another non-limiting embodiment of the invention, a tracking or position sensor 309 (shown in phantom and only shown in FIG. 6 is used to position the carriage 170 in the shaping position. As the carriage 170 displaces or interrupts the light beam of the position sensor 309, a signal is forwarded, e.g. along the cable 306 to the microprocessor 193 and the microprocessor forwards a signal, e.g. along the cable 308 to stop the rotation of stud rolls to position the carriage 170 and the glass sheets in the shaping position. Optionally, the sensor 309 and the timing of the microprocessor can be used for positioning the carriage relative to the beams.

After the glass sheets 68 and 69 are shaped, the carriage 170 and the shaped sheets are moved out of the furnace 74. More particularly and not limiting to the invention, the carriage 170 deflecting or interrupting the light beam of the sensor 304 opens the door 94, interrupting the light beam of the detector 302 closes the door 94, and interrupting the light beam of the detector 300 opens the door 92.

As can be appreciate the invention is not limited to the design of the furnace 74, and the invention contemplates practicing the invention with any type of furnace such as, but not limited to the furnaces shown in FIGS. 5 and 6 discussed above, and FIGS. 12-14 discussed below. More particularly, shown in FIG. 12 is a furnace 258 having the first and second furnaces 76 and 78, respectively, discussed above and a furnace 260 attached to the second opening 86 of the second furnace 78 (see FIGS. 5, 6 and 12). The furnace 260, in this non-limiting embodiment of the invention is similar, if not identical, to the first furnace 76. With the furnace arrangement shown in FIG. 12, the carriage 170 having the bending iron 70 having the sheets 68 and 69 in one non-limiting embodiment of the invention can move along the path designated by the arrow 270 through the furnace 76 to preheat the glass sheets 68 and 69, through the furnace 78 to shape the glass sheet 68 and through the furnace 260 to anneal the shaped glass sheets 60 and 61 as discussed above for the first furnace 76. In a second non-limiting embodiment of the invention, the furnace 258 can shape the glass sheets 68 and 69 using the first and second furnaces 76 and 78, respectively as discussed above by moving the carriage 170 having the bending iron 70 and the glass sheets 68 and 69 along a reciprocating path designated by the arrow 272 and shaping second group of glass sheets 68 and 69 using the furnaces 78 and 260 in a similar manner as the furnaces 76 and 78, and moving the second group of glass sheets along a reciprocating path designated by the arrow 274.

In still another non-limiting embodiment of the invention, the furnace 260 is a quenching station used to thermally temper or heat strengthen the shaped glass, e.g. but not limited to soda-lime-silicate shaped glass sheets. The glass sheets are moved along the path designated by the number 278 to shape the glass sheets 68 and 69 in the furnaces 76 and 78 as discussed above and to move the shaped glass sheets into the quenching furnace 250 to thermally temper the shaped glass sheets 60 and 61. Equipment for tempering glass sheets is will known in the art, e.g. disclosed in U.S. Pat. Nos. 3,936,291; 4,004,901; 4,976,762, and 8,234,883, which patents are hereby incorporated by reference.

Figure 13:
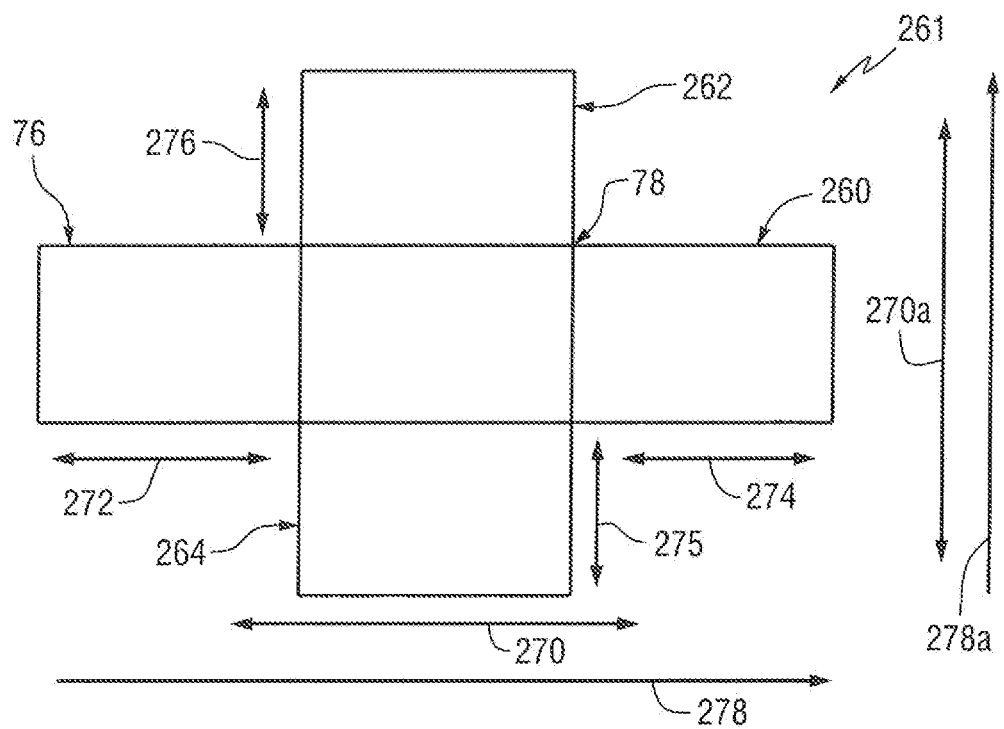
FIG. 13 is an elevated plan view of still another non-limiting embodiment of a pilot furnace incorporating features of the invention that can be used in the practice of the invention to, among other things, heat and shape glass sheets.

With reference to FIG. 13, there is shown another non-limited embodiment of a furnace designated by the number 261. The furnace 261 includes the furnaces 76, 78 and 260 (see FIG. 12) and furnaces 262 and 264. The shaping furnace 78 is between the furnaces 262 and 264. The glass processed using the furnace 261 has paths of travel 270 and 278 in the horizontal direction and the paths of travel 270a and 278a in the vertical direction as viewed in FIG. 13; the reciprocal paths of travel 272 and 274, and reciprocal paths of travel 275 and 276 in the vertical direction as viewed in FIG. 13. The glass sheets moving along the path of travel 276 can move into and out of the furnaces 262 and 78, and the furnaces 264 and 78. As can be appreciated the conveying system for the furnace 78 shown in FIG. 13 is adjustable or provided with a two tear conveying system to move the carriage along the path 278 through the furnaces 262, 78 and 262, and to move the carriage along the path 278a through the furnaces 76, 78 and 260.

With reference to FIG. 14, there is shown still another non-limiting embodiment of a furnace of the invention designated by the number 280. The furnace 280 includes a first tunnel furnace 282 to preheat the flat glass sheets 68 and 69 as they move in the direction of the arrow 284. The glass sheets 68 and 69 can be positioned on the bending iron 70, or as discussed above, the bending iron 70 can be positioned in the carriage 170. Shaping furnace 286 positioned at exit end 287 of the tunnel furnace 282 can have any number of gyrotrons to provide any number of shaping zones, e.g. one shaping zone 230 shown in solid line, or two shaping zones 231 shown in phantom, or three shaping zones shown in solid line 230 and phantom 231. A second tunnel furnace 288 is connected to exit end 289 of the shaping furnace 286 to anneal or thermally temper the shaped glass sheets 60 and 61.

As is appreciated by those skilled in the art, during the shaping of the sheets, the entrance opening 290 of the first tunnel furnace 282 and the exit opening 292 of the second tunnel furnace 288 can remain open. The doors to enter and leave the shaping furnace 286 are preferably opened to move the glass sheets to be shaped into and out of the furnace 288, and during the shaping of the glass sheets in the shaping furnace 286, the doors (see FIGS. 5 and 6) are closed to minimize heat loss during the sheet shaping process. Optionally and within the scope of the invention, the doors of the tunnel furnace can remain open for continuous movement of the glass sheets through the tunnel furnace to shape the glass sheets.

The invention further contemplates the use of safety equipment to limit or prevent damage to the persons operating the equipment, and/or to prevent or limit damage to the equipment. For example and not limiting to the discussion, the equipment includes an arc detector 330. The arc detector 330 is mounted in the furnace 78 and included a photocell connected to the microprocessor 193 by way of the cable 306. The arcing, as is known in the art, is ionized matter, e.g. but not limited to an air born pocket of dust and appears as a burst of light. The arcing phenomenon is well known in the art and no further discussion is deemed necessary. The photocell of the detector 330 senses the arcing and forwards a signal along the cable 305. The microprocessor 193 forwards a signal along the cable 308 to shut the gyrotron down to prevent damage to the personnel around the furnace 78 and to the gyrotron equipment.

The non-limiting embodiments of the invention were discussed to shape two glass sheets. As can now be appreciated, the invention is not limited thereto and the invention can be practiced on one sheet, or more than two sheets, e.g. but not limited to three, four or more sheets.

It will be readily appreciated by those skilled in the art that modifications can be made to the non-limiting embodiments of the invention disclosed herein without departing from the concepts disclosed in the foregoing description. Accordingly, the particular non-limiting embodiments of the invention described in detail herein are illustrative only and are not limiting to the scope of the invention, which is to be given the full breadth of the appended claims and any and all equivalents thereof.

What is claimed is:

1. A furnace for shaping glass sheets for aircraft transparencies, the furnace comprising:
a preheat and cooling furnace defined as a first furnace, the first furnace comprising:
a first sidewall, an opposite second sidewall, a top wall, an opposite bottom wall, a first opening and an opposite second opening;
a door for covering the first opening of the first furnace;
a first plurality of spaced stub conveyor rolls mounted on the first sidewall and a second plurality of spaced stub conveyor rolls mounted on the second sidewall, wherein each of the first and second plurality of stub rolls has a conveying end and an opposite drive end with the conveying end of the first and the second plurality of stub rolls within the first furnace and the drive end of the first and the second plurality of stub rolls extending out through its respective one of the first and second sidewalls of the first furnace, wherein the conveying end of the first and second plurality of stub rolls defines a first path through the first furnace, the first path extending from a position spaced from the first opening of the first furnace to the second opening of the first furnace, and the drive end of the first and the second plurality of stub rolls powered by a drive system;
a first heating system associated with the first furnace to heat and controllably cool the interior of the first furnace;
a shaping furnace defined as a second furnace, the second furnace comprising:
a first sidewall, an opposite second sidewall, a top wall, an opposite bottom wall, an opening and a rear wall opposite to the opening of the second furnace, wherein the second opening of the first furnace and the opening of the second furnace are connected to one another;
a third plurality of spaced stub conveyor rolls mounted on the first sidewall of the second furnace and a fourth plurality of spaced stub conveyor rolls mounted on the second sidewall of the second furnace, wherein each of the third and fourth plurality of stub rolls has a conveying end and an opposite drive end with the conveying end of the third and the fourth plurality of stub rolls within the second furnace and the drive end of the third and the fourth plurality of stub rolls extending out through its respective one of the first and second sidewalls of the second furnace, wherein the conveying end of the third and the fourth plurality of stub rolls defines a second path through the second furnace, the second path extending from the first path to the rear wall of the second furnace, and the drive end of the third and the fourth plurality of stub rolls powered by the drive system;
a second heating system within the second furnace, wherein the second heating system comprises a gyrotron system to heat selected portions of the glass sheet;
a U-shaped moveable conveyor comprising;
a first leg, an opposite second leg and a third leg joining ends of the first and the second legs to give the conveyor the U-shape, wherein the moveable conveyor has a top side and an opposite bottom side, the bottom side of the conveyor having wheels;
a fifth plurality of stub rolls having a conveying end and an opposite mounting end with the mounting end of the fifth plurality of stub rolls rotatably mounted on the top side of the first leg of the U-shaped conveyor with the conveying end of the fifth plurality of stub rolls between the first and second legs of the moveable conveyor, and a sixth plurality of stub rolls a conveying end and an opposite mounting end with the mounting end of the sixth plurality of stub rolls rotatably mounted on the top side of the second leg of the U-shaped conveyor with the conveying end of the sixth plurality of stub rolls between the first and second legs of the moveable conveyor;

wherein the moveable conveyor is sized for end of moveable conveyor having the third leg defined as the first end of the moveable conveyor to move into and out of the first opening of the first furnace such that with the first end of the moveable conveyor in the first opening of the first furnace the conveying end of the fifth plurality of stub rolls is aligned with the conveying end of the first plurality of stub rolls, and the conveying end of the sixth plurality of stub rolls is aligned with the conveying end of the second plurality of stub rolls to extend the first path from the first and second plurality of stub rolls to the first opening of the first furnace;

a carriage having an extended first arm and an opposite extended second arm, wherein the extended first arm is supported on the conveying end of the first and the fifth plurality of stub rolls, and the extended second arm is supported on the conveying end of the second and the sixth plurality of stub rolls;

wherein with the first end of the moveable conveyor in the first opening of the first furnace the carriage is moved along the fifth and sixth plurality of stub rolls of the moveable conveyor into the first opening of the first furnace and thereafter onto the first and second plurality of stub rolls by activating the drive system to rotate the drive end of the first and the second plurality of stub rolls in a first direction to move the carriage along the path away from the first opening of the first furnace toward the second furnace and with the first end of the moveable conveyor in the first opening of the first furnace, the carriage is moved along the first and second plurality of stub rolls toward the first opening of the first furnace and a from the second furnace, and thereafter onto the fifth and sixth plurality of stub rolls by activating the drive system to rotate the drive end of the first and the second plurality of stub rolls in a second direction opposite to the first direction to move the carriage along the first path toward the first opening of the first furnace and away from the second furnace.

2. The furnace according to claim 1, wherein the door covering the first opening of the first furnace is a first door moveably mounted at the first opening of the first furnace, and comprising a second door moveably mounted between the second opening of the first furnace and the opening of the second furnace, wherein when the first door and the second door are closed the interior of the first furnace and the interior of the second furnace are separated from one another and from the environment outside of the first and second furnace, and when the first door is closed and the second door is opened, the interior of the first and second furnaces are in communication with one another and separated from the environment outside of the first and second furnace.

3. The furnace according to claim 2 comprising sensors for tracking movement of the carriage through the furnaces, wherein the sensors operate on mechanisms to open and close the first and the second doors as needed to move the carriage along the conveyor.

4. The furnace according to claim 2 comprising a first sensor mounted in the first furnace spaced a predetermined distance from the first door of the first furnace and a second sensor mounted in the first furnace spaced a predetermined distance from the second door wherein the first sensor is connected to a door drive system to open or close the first door when the carriage interacts with the first sensor, and the second sensor is connected to the door drive system to open or close the second door when the carriage interacts with the second sensor.

5. The furnace according to claim 4 comprising a third sensor mounted in the second furnace spaced a predetermined distance from the second door of the second furnace wherein the third sensor is connected to the door drive operating the system to open or close the second door when the carriage interacts with the third sensor.

6. The furnace according to claim 5 comprising a monitoring system interacting with the third sensor and acting on the drive system of the fifth plurality of stub rolls to track the position of the carriage in the second furnace and to inactivate the drive system operating on the fifth plurality of stub rolls to position carriage in a position to be heated by the gyrotron.

7. The furnace according to claim 1 wherein the gyrotron system comprises a gyrotron to generate beams of microwave energy, an optical box to collimate the beams of microwave energy and control diameter of the beams of microwave energy, and a mirror box comprising one or more moveable mirrors to move the beams of microwave energy through a predetermined area between the conveying ends of the third and fourth plurality of stub rolls, wherein the optical box and the mirror box are mounted to the top wall of the second furnace.

8. The furnace according to claim 1, comprising pyrometers mounted in the top wall of the second furnace to monitor temperature of the glass sheets in the predetermined area between the conveying ends of the third and fourth plurality of stub rolls, the pyrometers connected to a monitor connected to power input to the gyrotron.

9. The pilot furnace according to claim 8 comprising scanning pyrometers mounted in the top wall of the first furnace, the scanning pyrometers connected to the monitor, wherein the monitor is connected to the first heating system to maintain the first temperature at a desired temperature.

10. The furnace according to claim 1 wherein the opening of the second furnace is a first opening and the rear wall of the second furnace is a moveable door providing the second furnace with a second opening opposite to the first opening of the second furnace; the furnace comprising:

a second preheat and cooling furnace defined as a third furnace, the third furnace comprising:

a first sidewall, an opposite second sidewall, a top wall, an opposite bottom wall, a first opening and an opposite second opening;

a door for covering the second opening of the third furnace;

a seventh plurality of spaced stub conveyor rolls mounted on the first sidewall of the third furnace and an eighth plurality of spaced stub conveyor rolls mounted on the second sidewall of the third furnace, wherein each of the seventh and the eighth plurality of stub rolls has a conveying end and an opposite drive end with the conveying end of the seventh and the eighth plurality of stub rolls within the third furnace and the drive end of the seventh and eighth plurality of stub rolls extending out through its respective one of the first and second sidewalls of the third furnace, wherein the conveying end of the seventh and eighth plurality of stub rolls defines a third path through the third furnace, the third path extending from second path to a position spaced from the second opening of the third furnace, and the drive end of the seventh and the eighth plurality of stub rolls powered by the drive system; and the first opening of the third furnace connected to the second opening of the second furnace.

11. The furnace according to claim 10 comprising:
a first door moveably mounted at the first opening of the first furnace; a second door moveably mounted between the second opening of the first furnace and the first opening of the second furnace, a third door moveably mounted between the second opening of the second furnace and the first opening of the third furnace and a fourth door moveably mounted over the second opening of the third furnace, and wherein when the first, second third and fourth doors are closed, the interior of the first, second and third furnaces are separated from one another and from the environment outside of the first, second and third furnaces, and when the first door and fourth doors are closed and the second and third doors are opened, the interior of the first, second and third furnaces are in communication with one another and separated from the environment outside of the first, second and third furnaces.

12. The furnace according to claim 11, wherein the carriage is moved into the third furnace by moving the first end of the moveable conveyor into the second opening of the third furnace to align the conveying end of the fifth and seventh plurality of stub rolls and the conveying end of the sixth and the eighth plurality of stub rolls, activating the drive system to power the drive end of the seventh and eighth plurality of stub rolls and moving the carriage from the conveying end of the fifth and sixth plurality of stub rolls to the conveying end of the seventh and eighth plurality of stub rolls.

13. A furnace for shaping glass sheets for aircraft transparencies, the furnace comprising:
a preheat and cooling furnace defined as a first furnace, the first furnace comprising:
   a first sidewall, an opposite second sidewall, a top wall, an opposite bottom wall, a first opening and an opposite second opening;
   a door for covering the first opening of the first furnace;
   a first plurality of spaced stub conveyor rolls mounted on the first sidewall and a second plurality of spaced stub conveyor rolls mounted on the second sidewall, wherein each of the first and second plurality of stub rolls has a conveying end and an opposite drive end with the conveying end of the first and the second plurality of stub rolls within the first furnace and the drive end of the first and the second plurality of stub rolls extending out through its respective one of the first and second sidewalls of the first furnace, wherein the conveying end of the first and second plurality of stub rolls defines a first path through the first furnace, the first path extending from a position spaced from the first opening of the first furnace to the second opening of the first furnace, and the drive end of the first and the second plurality of stub rolls powered by a drive system;
   a first heating system associated with the first furnace to heat and controllably cool the interior of the first furnace;
a shaping furnace defined as a second furnace, the second furnace comprising:
   a first sidewall, an opposite second sidewall, a top wall, an opposite bottom wall, an opening and a rear wall opposite to the opening of the second furnace,
   wherein the second opening of the first furnace and the opening of the second furnace are connected to one another;
   a third plurality of spaced stub conveyor rolls mounted on the first sidewall of the second furnace and a fourth plurality of spaced stub conveyor rolls mounted on the second sidewall of the second furnace, wherein each of the third and fourth plurality of stub rolls has a conveying end and an opposite drive end with the conveying end of the third and the fourth plurality of stub rolls within the second furnace and the drive end of the third and the fourth plurality of stub rolls extending out through its respective one of the first and second sidewalls of the second furnace, wherein the conveying end of the third and the fourth plurality of stub rolls defines a second path through the second furnace, the second path extending from the first path to the rear wall of the second furnace, and the drive end of the third and the fourth plurality of stub rolls powered by the drive system;
   a second heating system within the second furnace, wherein the second heating system comprises a gyrotron system to heat selected portions of the glass sheet;
a U-shaped moveable conveyor comprising:
   a first leg, an opposite second leg and a third leg joining ends of the first and the second legs to give the conveyor the U-shape, wherein the moveable conveyor has a top side and an opposite bottom side, the bottom side of the conveyor having wheels;
   a fifth plurality of stub rolls having a conveying end and an opposite mounting end with the mounting end of the fifth plurality of stub rolls rotatably mounted on the top side of the first leg of the U-shaped conveyor with the conveying end of the fifth plurality of stub rolls between the first and second legs of the moveable conveyor, and a sixth plurality of stub rolls a conveying end and an opposite mounting end with the mounting end of the sixth plurality of stub rolls rotatably mounted on the top side of the second leg of the U-shaped conveyor with the conveying end of the sixth plurality of stub rolls between the first and second legs of the moveable conveyor;
   wherein the moveable conveyor is sized for end of the moveable conveyor to move into the first opening of the first furnace with the conveying end of the fifth plurality of stub rolls aligned with the conveying end of the first plurality of stub rolls, and the conveying end of the sixth plurality of stub rolls aligned with the conveying end of the second plurality of stub rolls;
a carriage having an extended first arm and an opposite extended second arm, wherein the extended first arm is supported on the conveying end of the fifth plurality of stub rolls, and the extended second arm is supported on the conveying end of the sixth plurality of stub rolls;
wherein the moveable carriage is moved into the first furnace by moving the first end of the conveyor into the first opening of the first furnace to align the conveying end of the first and fifth plurality of stub rolls and the conveying end of second and sixth plurality of stub rolls, activating the drive system to power the drive end of the first and the second plurality of stub rolls and moving the carriage from the conveying end of the fifth and sixth plurality of stub rolls to the conveying end of the first and second plurality of stub rolls, and
wherein the door covering the first opening of the first furnace is a first door moveably mounted at the first opening of the first furnace, and comprising second door moveably mounted between the second opening of the first furnace and the opening of the second furnace, wherein when the first door and the second door are closed the interior of the first furnace and the interior of the second furnace are separated from one another and from the environment outside of the first and second furnace, and when the first door is closed and the second door is opened, the interior of the first and second furnaces are in communication with one another and separated from the environment outside of the first and second furnace, wherein the second door comprises a spacer frame made of pipe frame, a metal panel secured to one side of the spacer frame and a second metal panel secured to opposite second side of the spacer frame, and a first insulating material within the spacer frame between the first and the second metal panels a second insulating material over one of the metal panels and a metal foil over the second insulating material.

14. The furnace according to claim 13 wherein air is moved through the pipe frame to prevent warpage of the metal panels and the first insulating material is a low density high temperature insulating material sold under the registered trademark Super Firetemp®.

15. The furnace according to claim 13, comprising a bending iron mounted in the carriage, wherein the bending iron supports and shapes the glass sheet.

16. The furnace according to claim 15 wherein the bending iron comprises an articulating arm and the carriage is positioned in the second furnace with the articulating arm of the bending iron in the predetermined area.

17. A furnace for shaping glass sheets for aircraft transparencies, the furnace comprising:
- a preheat and cooling furnace defined as a first furnace, the first furnace comprising:
  - a first sidewall, an opposite second sidewall, a top wall, an opposite bottom wall, a first opening and an opposite second opening;
  - a door for covering the first opening of the first furnace;
  - a first plurality of spaced stub conveyor rolls mounted on the first sidewall and a second plurality of spaced stub conveyor rolls mounted on the second sidewall, wherein each of the first and second plurality of stub rolls has a conveying end and an opposite drive end with the conveying end of the first and the second plurality of stub rolls within the first furnace and the drive end of the first and the second plurality of stub rolls extending out through its respective one of the first and second sidewalls of the first furnace, wherein the conveying end of the first and second plurality of stub rolls defines a first path through the first furnace, the first path extending from a position spaced from the first opening of the first furnace to the second opening of the first furnace, and the drive end of the first and the second plurality of stub rolls powered by a drive system;
  - a first heating system associated with the first furnace to heat and controllably cool the interior of the first furnace;
- a shaping furnace defined as a second furnace, the second furnace comprising:
  - a first sidewall, an opposite second sidewall, a top wall, an opposite bottom wall, an opening and a rear wall opposite to the opening of the second furnace, wherein the second opening of the first furnace and the opening of the second furnace are connected to one another;
  - a third plurality of spaced stub conveyor rolls mounted on the first sidewall of the second furnace and a fourth plurality of spaced stub conveyor rolls mounted on the second sidewall of the second furnace, wherein each of the third and fourth plurality of stub rolls has a conveying end and an opposite drive end with the conveying end of the third and the fourth plurality of stub rolls within the second furnace and the drive end of the third and the fourth plurality of stub rolls extending out through its respective one of the first and second sidewalls of the second furnace, wherein the conveying end of the third and the fourth plurality of stub rolls defines a second path through the second furnace, the second path extending from the first path to the rear wall of the second furnace and the drive end of the third and the fourth plurality of stub rolls powered by the drive system;
  - a second heating system within the second furnace, wherein the second heating system comprises a gyrotron system to heat selected portions of the glass sheet, wherein the gyrotron system comprises a gyrotron to generate beams of microwave energy, an optical box to collimate the beams of microwave energy and control diameter of the beams of microwave energy, and a mirror box comprising one or more moveable mirrors to move the beams of microwave energy through a predetermined area between the conveying ends of the third and fourth plurality of stub rolls, wherein the optical box and the mirror box are mounted to the to wall of the second furnace;
  - an arc detector to sense ionization of ambient air in the second furnace by the gyrotron, the arc detector connected to a monitor connected to a power source for the gyrotron, wherein the monitor sends a signal to shut off power to the gyrotrons when the arc detector sends signal that arcing has occurred;
- a U-shaped moveable conveyor comprising:
  - a first leg, an opposite second leg and a third leg joining ends of the first and the second legs to give the conveyor the U-shape, wherein the moveable conveyor has a top side and an opposite bottom side, the bottom side of the conveyor having wheels;
  - a fifth plurality of stub rolls having a conveying end and an opposite mounting end with the mounting end of the fifth plurality of stub rolls rotatably mounted on the top side of the first leg of the U-shaped conveyor with the conveying end of the fifth plurality of stub rolls between the first and second legs of the moveable conveyor, and a sixth plurality of stub rolls a conveying end and an opposite mounting end with the mounting end of the sixth plurality of stub rolls rotatably mounted on the top side of the second leg of the U-shaped conveyor with the conveying end of the sixth plurality of stub rolls between the first and second legs of the moveable conveyor;
  - wherein the moveable conveyor is sized for end of the moveable conveyor to move into the first opening of the first furnace with the conveying end of the fifth plurality of stub rolls aligned with the conveying end of the first plurality of stub rolls, and the conveying end of the sixth plurality of stub rolls aligned with the conveying end of the second plurality of stub rolls;
- a carriage having an extended first arm and an opposite extended second arm wherein the extended first arm is supported on the conveying end of the fifth plurality of stub rolls, and the extended second arm is supported on the conveying end of the sixth plurality of stub rolls;

wherein the carriage is moved into the first furnace by moving the first end of the conveyor into the first opening of the first furnace to align the conveying end of the first and fifth plurality of stub rolls and the conveying end of second and sixth plurality of stub rolls, activating the drive system to power the drive end of the first and the second plurality of stub rolls and moving the carriage from the conveying end of the fifth and sixth plurality of stub rolls to the conveying end of the first and second plurality of stub rolls.

* * * * *